United States Patent
Maekawa et al.

(10) Patent No.: US 6,471,420 B1
(45) Date of Patent: Oct. 29, 2002

(54) VOICE SELECTION APPARATUS VOICE RESPONSE APPARATUS, AND GAME APPARATUS USING WORD TABLES FROM WHICH SELECTED WORDS ARE OUTPUT AS VOICE SELECTIONS

(75) Inventors: Hidetsugu Maekawa, Hirakata (JP); Tatsumi Watanabe, Kyoto (JP); Kazuaki Obara, Neyagawa (JP); Kazuhiro Kayashima, Hirakata (JP); Kenji Matsui, Hirakata (JP); Yoshihiko Matsukawa, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 08/434,760

(22) Filed: May 4, 1995

(30) Foreign Application Priority Data

May 13, 1994 (JP) .............................. 6-099629
Nov. 9, 1994 (JP) .............................. 6-274911

(51) Int. Cl.$^7$ .............................................. G10L 21/00
(52) U.S. Cl. ..................... 395/2.79; 704/250; 704/258
(58) Field of Search ............................... 395/2.67, 2.79, 395/2.84, 2.62, 2.63, 2.41, 2.4, 2.09, 2.59, 2.64, 2.48, 2.49, 2.81; 704/258, 270, 275, 253, 254, 232, 231, 200, 250, 255, 239, 240

(56) References Cited

U.S. PATENT DOCUMENTS

| | | | |
|---|---|---|---|
| 3,582,559 A | 6/1971 | Hitchcock et al. | 704/253 |
| 4,245,430 A | 1/1981 | Hoyt | 446/175 |
| 4,696,653 A | 9/1987 | McKeefery | 446/175 |
| 4,717,364 A | 1/1988 | Furukawa | 446/175 |
| 4,725,956 A | 2/1988 | Jenkins | 701/2 |
| 4,799,171 A | 1/1989 | Cummmings | 704/272 |
| 4,829,578 A | 5/1989 | Roberts | 704/233 |

(List continued on next page.)

FOREIGN PATENT DOCUMENTS

| | | | |
|---|---|---|---|
| EP | 0067052 | 12/1982 | G05D/3/10 |
| EP | 0254409 | 1/1988 | G10L/5/06 |
| EP | 0 283 743 | 2/1988 | |
| EP | 0 436 397 | 12/1990 | |
| JP | 3-098078 | 4/1991 | G09B/5/00 |
| JP | 3-129400 | 6/1991 | G10L/5/06 |

OTHER PUBLICATIONS

First Office Action dated Feb. 22, 2002 for corresponding Chinese patent application No. 95107149.1.

(List continued on next page.)

Primary Examiner—Richemond Dorvil
(74) Attorney, Agent, or Firm—Renner, Otto, Boisselle & Sklar

(57) ABSTRACT

A game apparatus of the invention includes: a voice input section for inputting at least one voice set including voice uttered by an operator, for converting the voice set into a first electric signal, and for outputting the first electric signal; a voice recognition section for recognizing the voice set on the basis of the first electric signal output from the voice input means; an image input section for optically detecting a movement of the lips of the operator, for converting the detected movement of lips into a second electric signal, and for outputting the second electric signal; a speech period detection section for receiving the second electric signal, and for obtaining a period in which the voice is uttered by the operator on the basis of the received second electric signal; an overall judgment section for extracting the voice uttered by the operator from the input voice set, on the basis of the voice set recognized by the voice recognition means and the period obtained by the speech period detection means; and a control means for controlling an object on the basis of the voice extracted by the overall judgment means.

8 Claims, 28 Drawing Sheets

U.S. PATENT DOCUMENTS

| | | | | |
|---|---|---|---|---|
| 4,840,602 A | | 6/1989 | Rose | 446/175 |
| 4,857,030 A | * | 8/1989 | Rose | 395/2.81 |
| 5,209,695 A | | 5/1993 | Rothschild | 446/175 |
| 5,210,791 A | | 5/1993 | Krasik | 379/377 |
| 5,222,147 A | | 6/1993 | Koyama | 704/249 |
| 5,305,422 A | | 4/1994 | Junqua | 704/253 |
| 5,579,431 A | | 11/1996 | Reaves | 704/214 |
| 5,615,296 A | * | 3/1997 | Stanford et al. | 395/2.81 |

OTHER PUBLICATIONS

Lawrence R. Rabiner and Ronald W. Schafer, "Digital Processing of Speech Signals," Prentice–Hall (Upper Saddle River, NJ) 1978, pp. 489–493.

L. R. Rabiner and M. R. Sambur, "An Algorithm for Determining the Endpoints of Isolated Utterances" Bell System Technical Journal, vol. 54, No. 2, Feb. 1, 1975, pp. 297–315.

R. J. Johnson and G. F. Snyder, "Speech Detector" IBM Technical Disclosure Bulletin, vol. 22, Dec. 1979, pp. 2624–2625.

Proceedings of the International Conference on Neural Networks (ICN, San Francisco, Mar. 28–Apr. 1, 1993, vol. 2, 28 Mar. 1993, Institute of Electrical and Electronics Engineers, pp. 667–671, XP000369438 Bregler C et al.: "Bimodal Sensor Integration on the Empire of Speech–Reading".

* cited by examiner

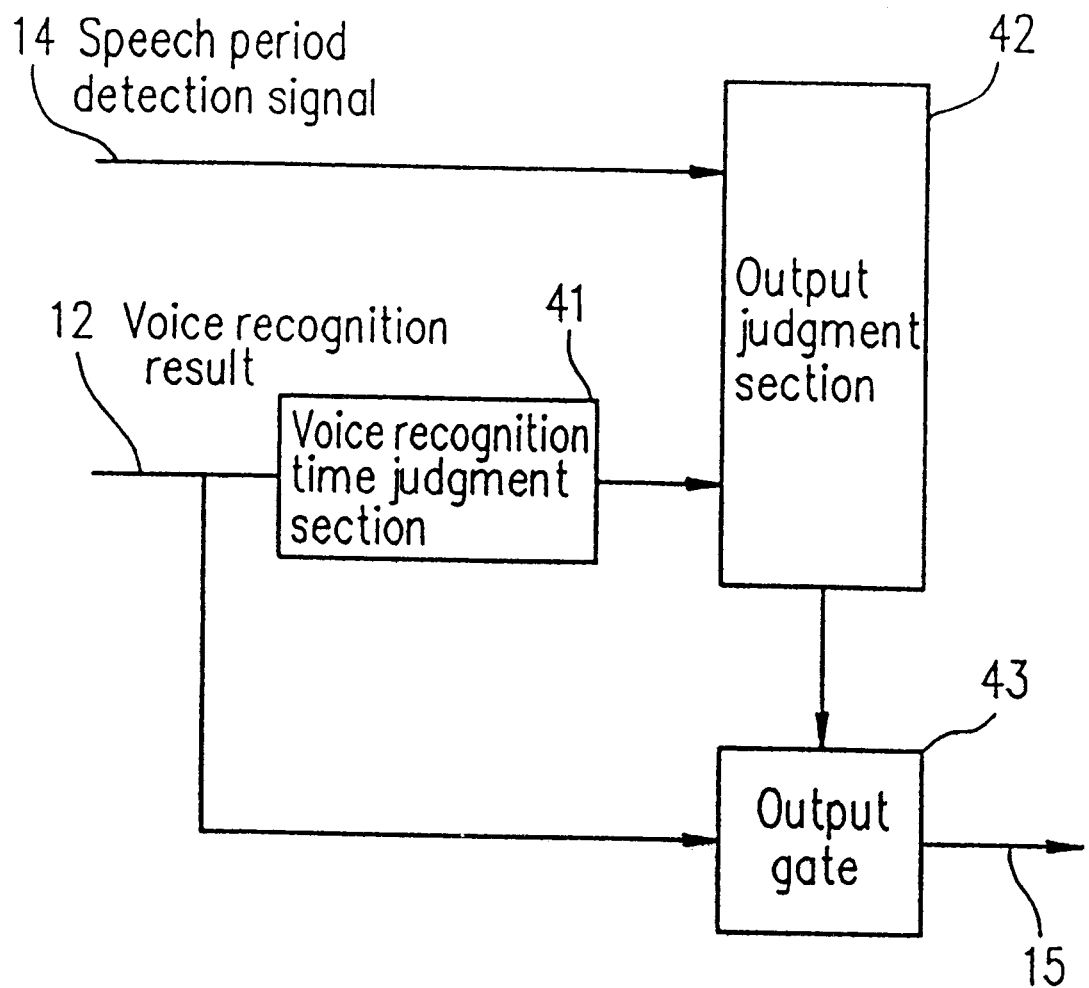

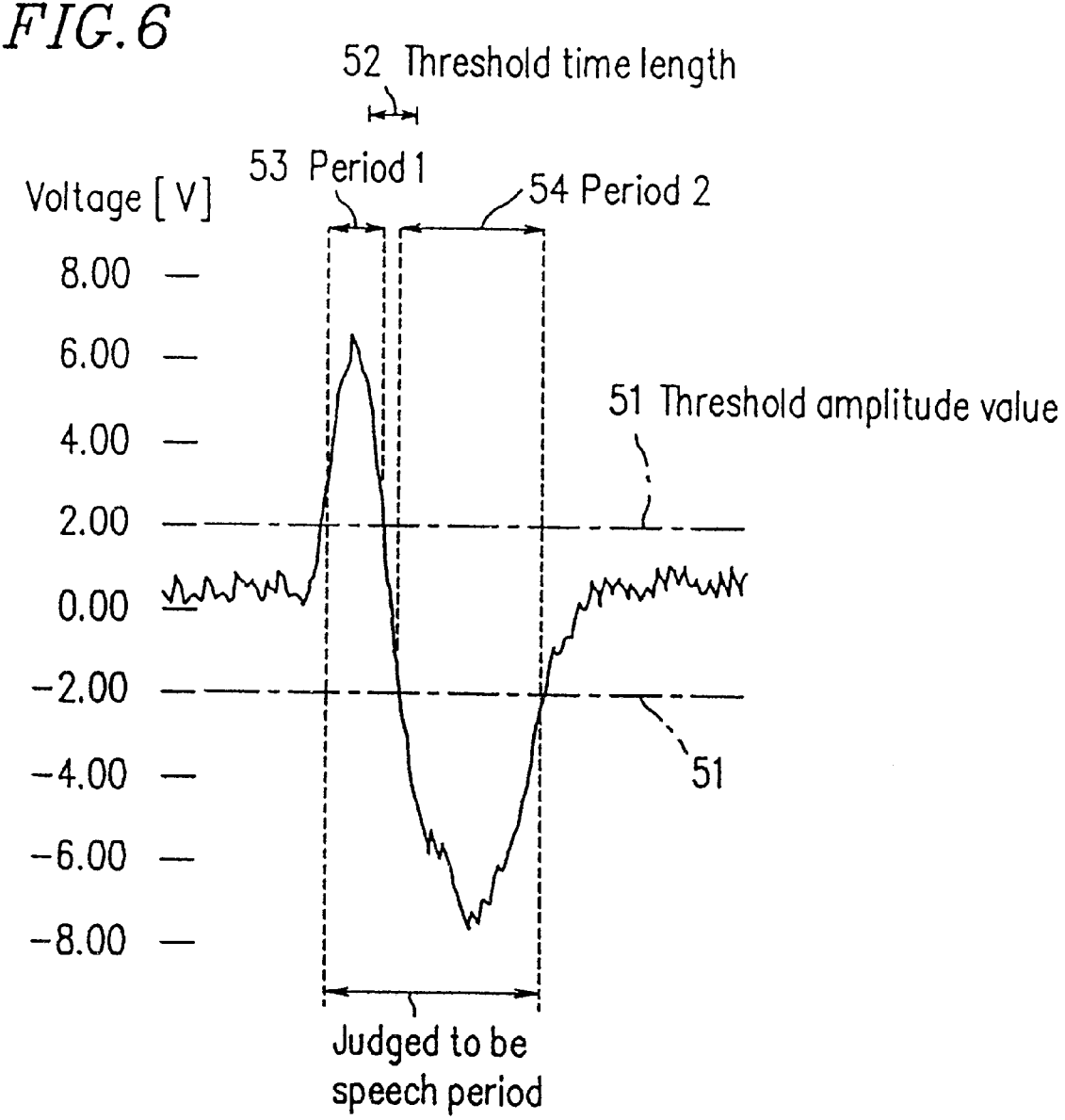

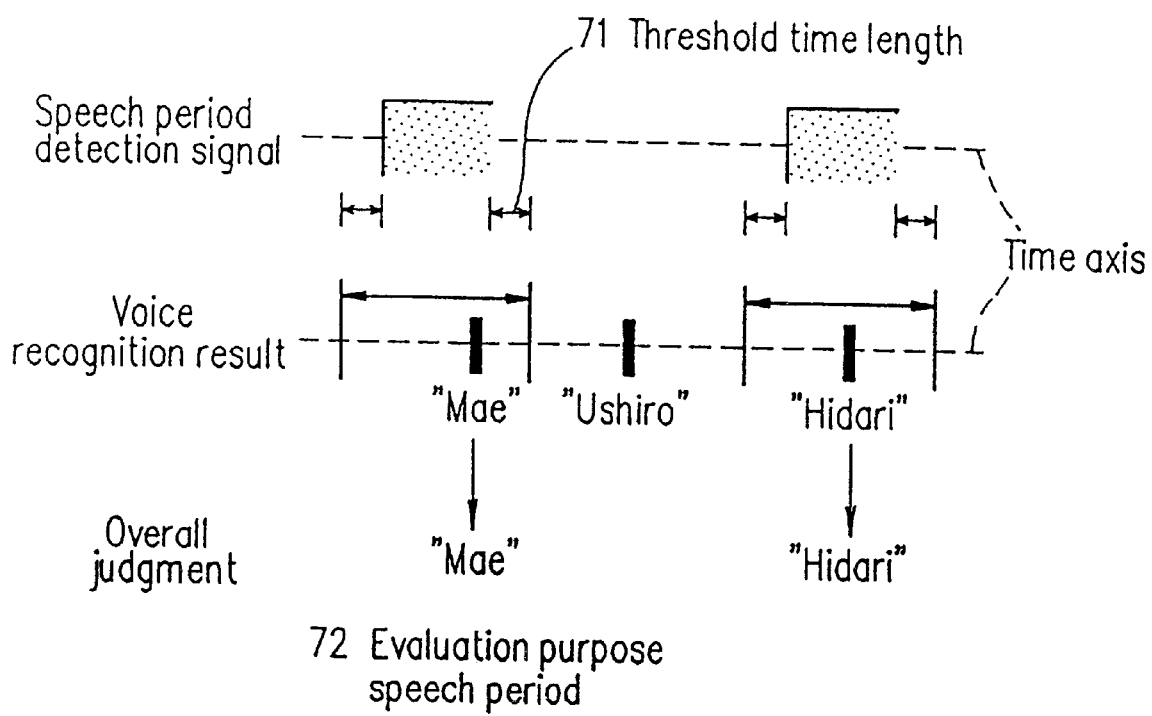

FIG.14A

Degree of reliability for lip reading

| Degree of reliability for voice recognition | Large | Middle | Small |
|---|---|---|---|
| Large | Voice | Lip | Lip |
| Middle | Voice | Voice | Lip |
| Small | Voice | Voice | Voice |

FIG.14B

Degree of reliability for lip reading

| Degree of reliability for voice recognition | Large | Middle | Small |
|---|---|---|---|
| Large | Lip | Lip | Lip |
| Middle | Voice | Lip | Lip |
| Small | Voice | Voice | Lip |

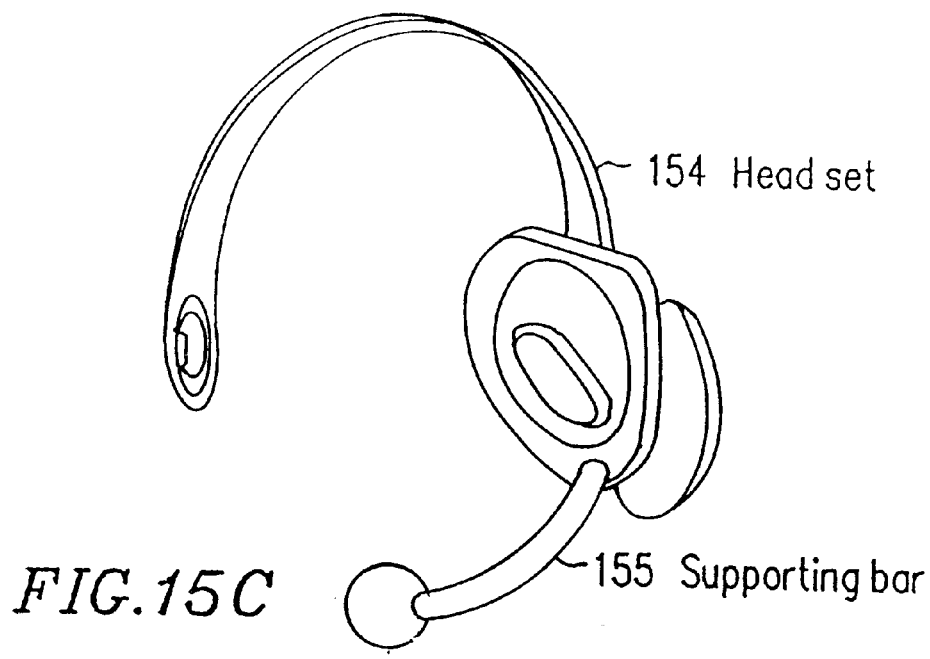
FIG.15C
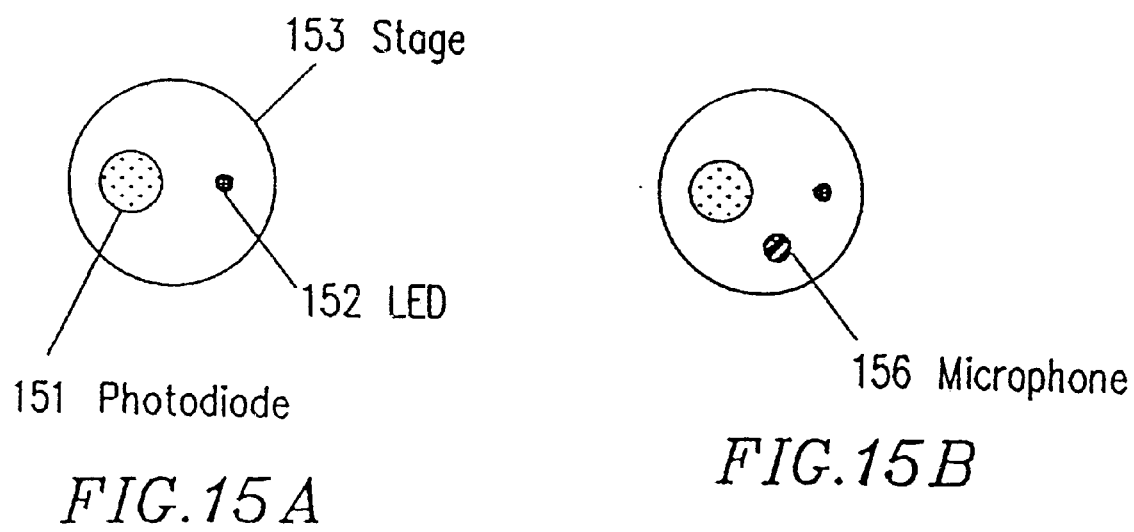
FIG.15A
FIG.15B

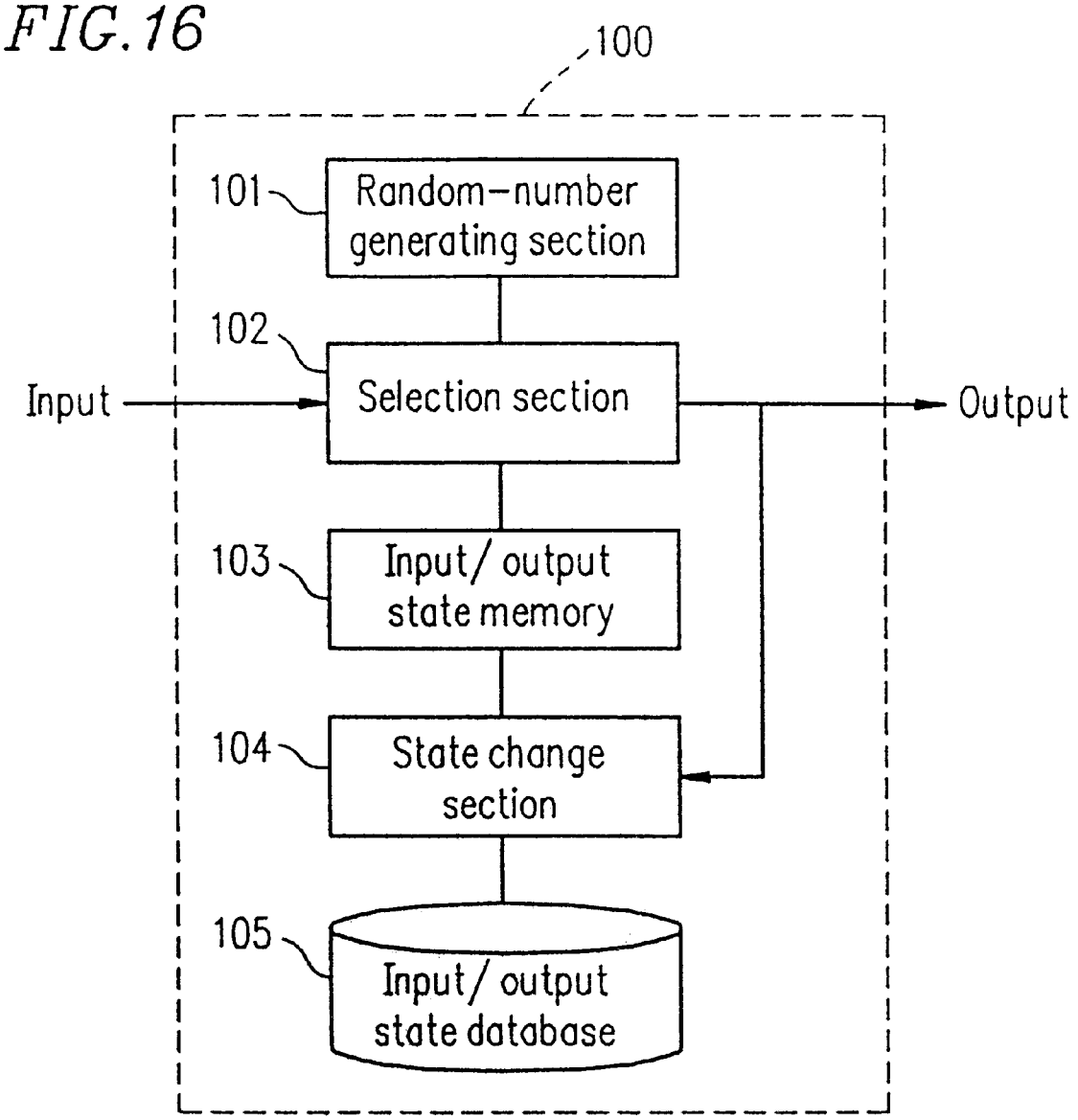

FIG.17A

Initial state

| Input | Output voice |
|---|---|
| 0 | Ohayo Genki? |
| 1 | Konnichiwa Genki? |
| 2 | Nani? Hai |
| ⋮ | ⋮ |

Input/output state for "Genki?"

| Input | Output voice |
|---|---|
| 0 | Dokoniikouka? Nanishiteasobou? |
| 1 | Doushitano? Genkidashite! Yasundara? |
| ⋮ | ⋮ |

202

VOICE SELECTION APPARATUS VOICE RESPONSE APPARATUS, AND GAME APPARATUS USING WORD TABLES FROM WHICH SELECTED WORDS ARE OUTPUT AS VOICE SELECTIONS

BACKGROUND OF THE INVENTION

1. Field of the Invention

The present invention relates to a game apparatus which can be operated by voice, an input device for inputting an image of a mouth or lips and/or voice, and a voice response apparatus.

2. Description of the Related Art

FIG. 34 shows an example of a conventional game apparatus. In accordance with this game apparatus, an operator uses a remote controller including a radio transmitter at his/her hand in order to operate an airship 7 including a radio receiver. As shown in FIG. 34, such a conventional game apparatus generally employs joy sticks 161 incorporated in the remote controller, with which the operator operates the desired object (airship) 7. When the operator moves the joy sticks 161, the respective angles thereof are detected by angle detection sections 162 and 163, and are converted into electric signals so as to be input to a control section 164. The control section 164 outputs a radio control signal for controlling the movements of the airship 7 in accordance with the angles of the joy sticks 161.

However, the use of the joy sticks 161, as required by conventional game apparatuses, does not allow a natural operation by humans (operators). This has presented problems in that it takes time for an operator to acquire proficiency in the operation and that quick reaction cannot always be achieved as required. In another instance of a game apparatus such that an operator operates a balloon equipped with a driving apparatus rather than an airship, the movements of the balloon are also controlled in the above-mentioned manner so that there is a problem in that the movements become non-animate or inorganic, thereby ruining the "human" feel inherent to balloons.

On the other hand, there has been proposed an apparatus for recognizing the voice of an operator by inputting an image of the mouth or lips of the operator. However, such an apparatus requires sophisticated optical system lenses, thereby increasing the size and scale of the entire apparatus as well as being expensive.

SUMMARY OF THE INVENTION

The game apparatus of this invention, includes voice input means for inputting at least one voice set including voice uttered by an operator, for converting the voice set into a first electric signal, and for outputting the first electric signal; voice recognition means for recognizing the voice set on the basis of the first electric signal output from the voice input means; image input means for optically detecting a movement of lips of the operator, for converting the detected movement of lips into a second electric signal, and for outputting the second electric signal; speech period detection means for receiving the second electric signal, and for obtaining a period in which the voice is uttered by the operator on the basis of the received second electric signal; overall judgment mans for extracting the voice uttered by the operator from the input voice set, on the basis of the voice set recognized by the voice recognition means and the period obtained by the speech period detection means; and control means for controlling an object on the basis of the voice extracted by the overall judgment means.

In one embodiment of the invention, the speech period detection means includes: differentiation means for detecting a degree of change in the second electric signal output from the image input means; and means for determining, when the degree of change detected by the differentiation means exceeds a predetermined value, that corresponding voice is uttered by the operator.

In another embodiment of the invention, the overall judgment means includes: means for producing an evaluation period by adding a period having a predetermined length to the period obtained by the speech period detection means; means for detecting a recognition result output time at which the voice set recognized by the voice recognition means is output from the voice recognition means; and means for performing a comparison between the recognition result output time and the evaluation period, and for determining that voice of which the recognition result output time falls within the evaluation period in the voice set is the voice uttered by the operator.

Alternatively, the game apparatus of this invention includes: image input means for optically inputting a movement of lips of an operator, for converting the input movement of lips into an electric signal, and for outputting the electric signal; lip reading means for obtaining the movement of lips on the basis of the electric signal, for recognizing a word corresponding to the obtained movement of lips, and for outputting the recognition result; and control means for controlling an object in accordance with a control signal based on the recognition result.

In one embodiment of the invention, the lip reading means includes: storage means for storing a predetermined number of words; and matching means for selecting one word from the predetermined number of words on the basis of the obtained movement of lips, and for determining that the selected word is the word corresponding to the movement of lips.

In another embodiment of the invention, the storage means stores movements of lips corresponding to the predetermined number of words as reference patterns, and the matching means calculates distances from the obtained movement of lips for all of the reference patterns, and selects a word corresponding to a minimum one of the calculated distances for the reference patterns.

In still another embodiment of the invention, the game apparatus further includes: voice input means for inputting voice, for converting the voice into a further electric signal, and for outputting the further electric signal; voice recognition means for recognizing the voice on the basis of the further electric signal output from the voice input means; and overall judgment means for outputting the control signal to be applied to the control means based on both the recognition result by the voice recognition means and the recognition result by the lip reading means.

In still another embodiment of the invention, the game apparatus further includes: means for obtaining a degree of voice recognition reliability for the recognition result by the voice recognition means; and means for obtaining a degree of lip reading reliability for the recognition result by the lip reading means, wherein the overall judgment means selects one of the recognition result by the voice recognition means and the recognition result by the lip reading means, based on the degree of voice recognition reliability and the degree of lip reading reliability, and outputs the selected recognition result as the control signal.

In still another embodiment of the invention, the image input means includes light emitting means for emitting light, and a photodetective means for receiving the light reflected from the lips of the operator and for converting the received light into the second electric signal.

In still another embodiment of the invention, the light is radiated to the lips from the side of the lips.

In still another embodiment of the invention, the light is radiated to the lips from the front of the lips.

In still another embodiment of the invention, the voice input means includes at least one microphone.

In still another embodiment of the invention, the voice input means includes at least one microphone, and the microphone and the light emitting means and the photodetective means of the image input means are provided on a single stage.

The input device of this invention includes: a head set of a headphone type; a supporting bar having one end joined to the head set; a stage joined to the other end of the supporting bar, the stage including at least one light emitting element for generating light with which lips of an operator is irradiated and at least one photodetective element for receiving the light reflected from the lips provided thereon.

In one embodiment of the invention, the stage further includes voice input means for inputting voice provided thereon.

The voice selection apparatus of this invention includes: first memory means for storing a plurality of tables, each of the tables including a plurality of words which can be output for one input; second memory means for storing one of the plurality of tables; selection means for selecting one word from the plurality of words included in the one table stored in the second memory means in accordance with an input which is externally input, and for outputting the selected one word as voice; and change means for changing the one table stored in the second memory to another table of the plurality of tables stored in the first memory means, the table being determined depending on the selected one word.

In one embodiment of the invention, the voice selection apparatus further includes means for generating a random number, wherein the selection means selects the one word from the plurality of words by using the random number.

Alternatively, the voice selection apparatus includes: memory means for storing a table, the table including a plurality of words which can be output in response to one input; selection means for receiving an input which is externally input, for selecting one word from the plurality of words included in the table which is stored in the memory means by using a random number, and for outputting the selected one word as voice; and means for generating the random number.

The voice response apparatus of this invention includes: the voice selection apparatus mentioned above; and a voice recognition apparatus for receiving voice, for recognizing the voice, and for outputting the recognition result to the voice selection apparatus.

Alternatively, the game apparatus of this invention includes the voice response apparatus mentioned above.

Alternatively, the game apparatus of this invention includes a plurality of voice response apparatuses mentioned above, whereby the plurality of voice response apparatuses can perform conversation with each other.

Alternatively, the game apparatus of this invention includes: a plurality of voice input sections for converting input voice into an electric signal, the plurality of voice input sections respective corresponding to different directions; and direction detection means for obtaining an energy of the electric signal for each of the plurality of voice input sections, for determining one of the plurality of voice input sections having a maximum energy, and for determining a direction corresponding to the determined one voice input section as a direction from which the voice is originated.

In one embodiment of the invention, the game apparatus further includes: operation means for operating an object; and control means for controlling the operation means in order to change a direction in which the object is to be operated to the determined direction.

In another embodiment of the invention, the game apparatus further includes: direction selection means including: measurement means for measuring a present direction of the operation of the object; and means for inputting the determined direction, for obtaining a target direction based on the present direction and the determined direction, and for storing the target direction; and operation means for operating the object, wherein the direction selection means controls the operation means so that the present direction of the operation of the object substantially agrees to the target direction, by using a difference between the target direction and the present direction.

Alternatively, the game apparatus of this invention includes direction selection means, the direction selection means including: input means for inputting a relative direction by using voice; measurement means for measuring a present direction of an object; and means for obtaining a target direction based on the present direction and the input relative direction, and for storing the target direction, wherein the direction selection means controls the object so that the present direction of the object substantially agrees to the target direction, by using a difference between the target direction and the present direction.

In one embodiment of the invention, the input means includes an input section through which the voice is input, and a recognition section for recognizing the relative direction based on the input voice.

Alternatively, the game apparatus of this invention includes direction selection means, the direction selection means including: input means for inputting an absolute direction by using voice; means for determining a target direction based on the absolute direction, and for storing the target direction; and measurement means for measuring a present direction of an object, wherein the direction selection means controls the object so that the present direction of the object substantially agrees to the target direction, by using a difference between the target direction and the present direction.

In one embodiment of the invention, the input means includes an input section through which the voice is input, and a recognition means for recognizing the absolute direction based on the input voice.

The voice recognition apparatus of this invention includes: first detection means for receiving an electric signal corresponding to voice, and for detecting a voice termination point representing a time at which the input of the voice is terminated, based on the electric signal; second detection means for determining a speech period, the speech period being a period in which the voice is uttered within a whole period in which the voice is input, based on the electric signal; feature amount extracting means for producing a feature amount vector, on the basis of a part of the electric signal corresponding to the speech period; memory means for storing feature amount vectors for a plurality of voice candidates which are previously generated; and means for recognizing the input voice, by comparing the feature amount vector from the feature amount extracting means with each of the feature amount vectors of the plurality of voice candidates stored in the memory means.

In one embodiment of the invention, the first detection means includes: means for dividing the electric signal into a plurality of frames each having a predetermined length; calculation means for obtaining an energy of the electric signal for each of the plurality of frames; and determination means for determining the voice termination point based on a variance of the energy.

In another embodiment of the invention, the determination means determines the voice termination point by comparing a predetermined threshold value with the variance of the energy, and the voice termination point corresponds to a time at which the variance of the energy agrees to the threshold value while the variance of the energy is changed from a value larger than the threshold value to a value smaller than the threshold value.

In still another embodiment of the invention, the determination means uses a variance for energies of a predetermined number of frames among the energies of the plurality of frames.

In still another embodiment of the invention, the second detection means includes: means for smoothing the energy of the electric signal; first circulation memory means for sequentially storing the energy of the electric signal for each frame before smoothing; second circulation memory means for sequentially storing the smoothed energy for each frame; threshold value calculation means for calculating a speech period detecting threshold value, by using both of the energy before smoothing stored in the first circulation memory means at a time at which the voice termination point is detected and the smoothed energy stored in the second circulation memory means at a time at which the voice termination point is detected; and speech period determination means for determining the speech period by comparing the energy before smoothing with the speech period detecting threshold value.

In still another embodiment of the invention, the threshold value calculation means calculates the speech period detecting threshold value, by using a maximum value of the energy before smoothing stored in the first circulation memory means at a time at which the voice termination point is detected, and a minimum value of the smoothed energy stored in the second circulation memory means at a time at which the voice termination point has not been detected.

In still another embodiment of the invention, the feature amount detection means calculates a zero crossing number of each frame of the electric signal, a zero crossing number of each frame of a signal which is obtained by differentiating the electric signal, and the energy of the electric signal, from the speech period of the electric signal, and wherein these obtained values are used as elements of the feature amount vector.

Alternatively, the voice response apparatus of this invention includes: at least one voice recognition apparatus mentioned above; and at least one control apparatus for controlling an object based on a recognition result of the at least one voice recognition apparatus.

In one embodiment of the invention, the voice response apparatus further includes: transmission means, connected to the at least one voice recognition apparatus, for transmitting the recognition result by the at least one voice recognition apparatus; and receiving means, connected to the at least one control apparatus, for receiving the transmitted recognition result, and for applying the recognition result to the at least one control apparatus, wherein the at least one control apparatus and the receiving means are attached to the object, whereby the object can be controlled by remote control.

Thus, the invention described herein makes possible the advantages of: (1) providing a low-cost game apparatus of a simple configuration which can be operated by human voice, does not require proficiency in the operation, usable in a noisy environment or under circumstances that do not allow easy utterance by a speaker, and can be used by those who have speech impediments; (2) providing a voice recognition apparatus which allows a game apparatus or a toy to be naturally operated; and (3) providing a voice response apparatus the operation of which can be changed in response to voice input thereto.

These and other advantages of the present invention will become apparent to those skilled in the art upon reading and understanding the following detailed description with reference to the accompanying figures.

BRIEF DESCRIPTION OF THE DRAWINGS

FIG. 4 is a block diagram showing a detailed configuration for an overall decision section according to Example 1 of the present invention.

FIG. 6 is a diagram showing an operation of an overall decision section according to Example 1 of the present invention.

FIG. 7 is a diagram showing an operation of an overall decision section according to Example 1 of the present invention.

FIG. 14A is a diagram showing an operation of an overall decision section according to Example 3 of the present invention.

FIG. 14B is a diagram showing another operation of an overall decision section according to Example 3 of the present invention.

FIG. 15A is diagram showing an exemplary configuration for an input device according to the present invention.

FIG. 15B is diagram showing an exemplary configuration for an input device according to the present invention.

FIG. 16 is a diagram showing a configuration for a voice selection apparatus according to Example 4 of the present invention.

FIG. 17A is a diagram showing inputs and outputs of the voice selection apparatus shown in FIG. 16.

FIG. 17B is a diagram showing inputs and outputs of the voice selection apparatus shown in FIG. 16.

DESCRIPTION OF THE PREFERRED EMBODIMENTS

EXAMPLE 1

Hereinafter, a game apparatus according to Example 1 of the present invention will be described with reference to the accompanying figures. In accordance with the game apparatus of the present example, an airship is operated by voice commands corresponding to various movements of the airship. The voice commands include 6 commands, namely, "mae" (i.e., "forward"), "ushiro" (i.e., "backward"), "migi" (i.e., "right"), "hidari" (i.e., "left"), "ue" (i.e., "up"), and "shita" (i.e., "down"). In the present example, a signal representing the movement of the lips of a speaker (hereinafter referred to as a "lip movement signal") is input to the game apparatus, as well as a voice signal originating from the speaker. A processing for determining whether or not a speaker, i.e., an operator of this game apparatus is speaking is performed based on the voice signal and the lip movement signal. As a result, it becomes possible to prevent the game apparatus from having a malfunction due to the ambient noise, such as the voice uttered by another person in particular.

Figure 1:
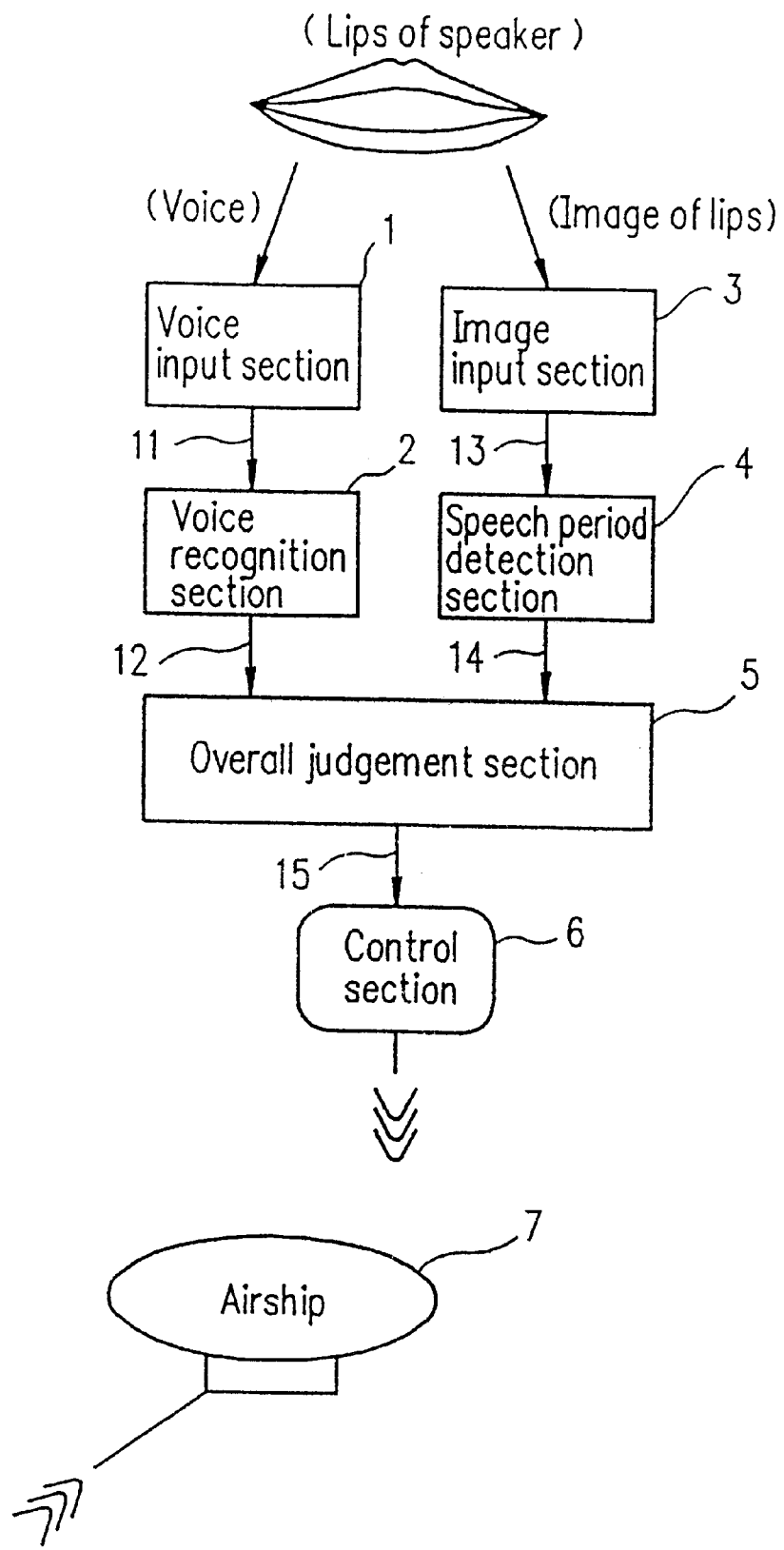
FIG. 1 is a block diagram showing a configuration for a game apparatus according to Example 1 of the present invention.

FIG. 1 shows a configuration for the game apparatus according to the present Example. As shown in FIG. 1, the game apparatus includes a voice input section 1 for processing input voice, a voice recognition section 2, an image input section 3, and a speech period detection section 4. The image input section 3 processes a lip movement signal representing the movement of the lips of a speaker. The voice recognition section 2 and the speech period detection section 4 are both connected to an overall judgment section 5. The overall judgment section 5 determines a command given by the speaker based on the input voice and movement of the lips of the speaker. The judgment result by the overall judgment section 5 is supplied to a control section 6. The control section 6 controls an airship 7 based on the judgment result.

First, voice including a command given by the speaker is input to the voice input section 1. A common microphone or the like can be employed for inputting the voice. The voice input section 1 converts the input voice into an electric signal, which is output as a voice signal 11 to the voice recognition section 2. The voice recognition section 2 analyzes the voice signal 11 so as to output a result of the analysis as a voice recognition result 12. The analysis of the voice signal 11 can be conducted by a conventionally known method, such as DP matching.

Figure 2:
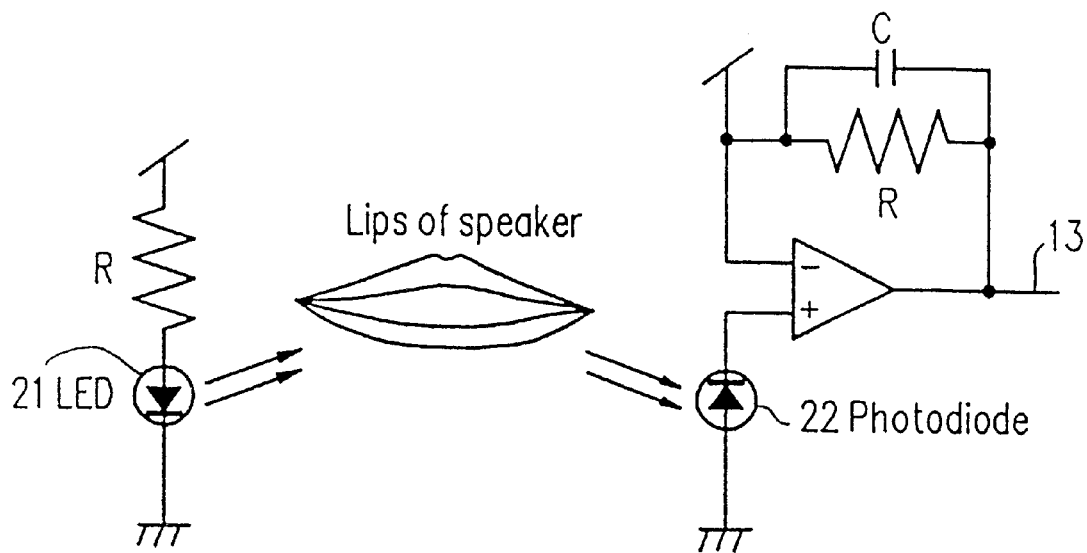
FIG. 2 is a diagram showing a detailed configuration for an image input section according to Examples 1 to 3 of the present invention.

Concurrently with the above process for the input voice, a process for the lip movement signal is performed. When the speaker gives a command, the movement of the lips of the speaker is input to the image input section 3. FIG. 2 shows an exemplary configuration for the image input section 3. In accordance with the image input section 3 of the present example, light emitted from an LED (Light Emitting Diode) 21 is radiated on a general area including the lips (hereinafter referred to as a "lip region") of the speaker. Light reflected from the lip region is detected by a photodiode 22. Thus, the lip movement signal 13, which is in accordance with the movement of the lips of the speaker, is output from the image input section 3. When the lips of the speaker move, the level of the lip movement signal 13 varies in accordance with changes in the shade in the vicinity of the lips of the speaker. The light from the LED 21 may be radiated orthogonally, i.e., from the front of the speaker, or laterally, i.e., from either side of the speaker.

Figure 3:
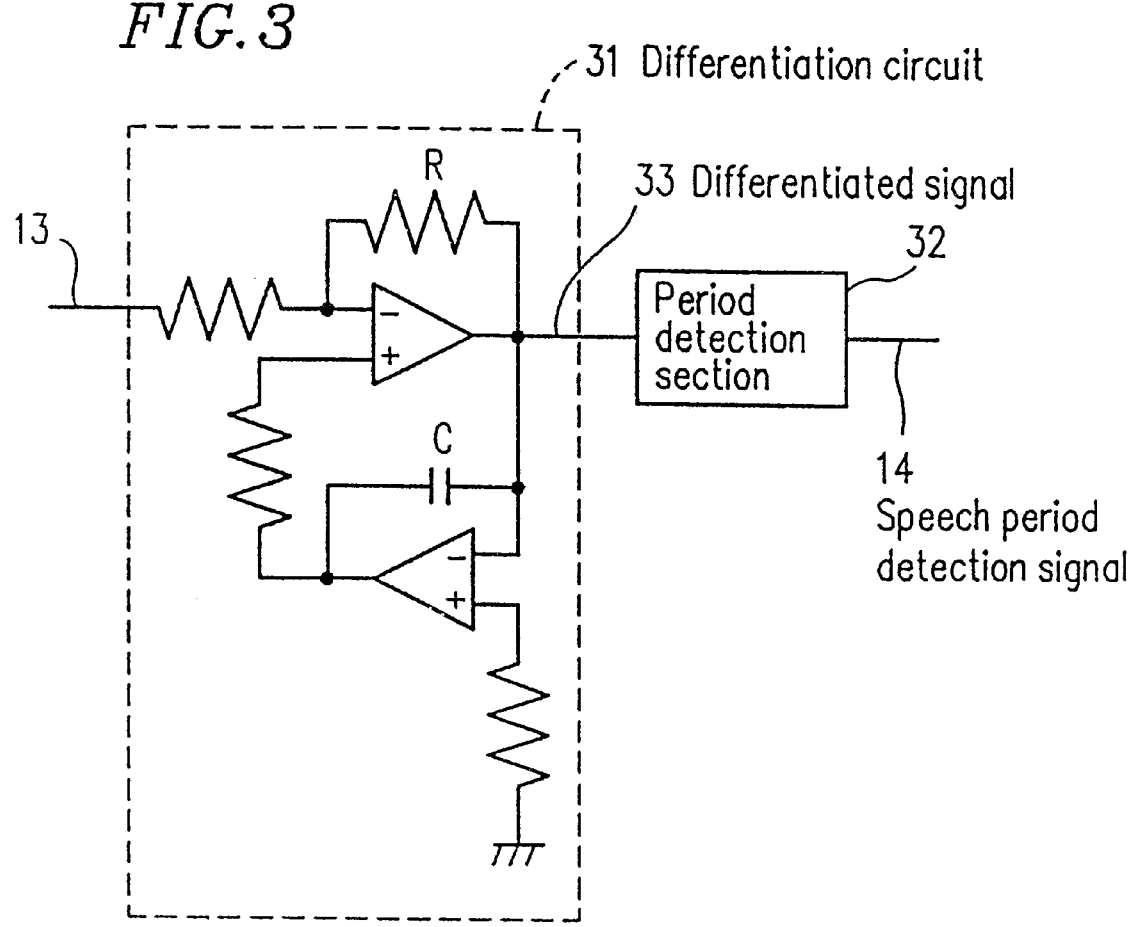
FIG. 3 is a diagram showing a detailed configuration for a speech period detection section according to Example 1 of the present invention.
Figure 5A:
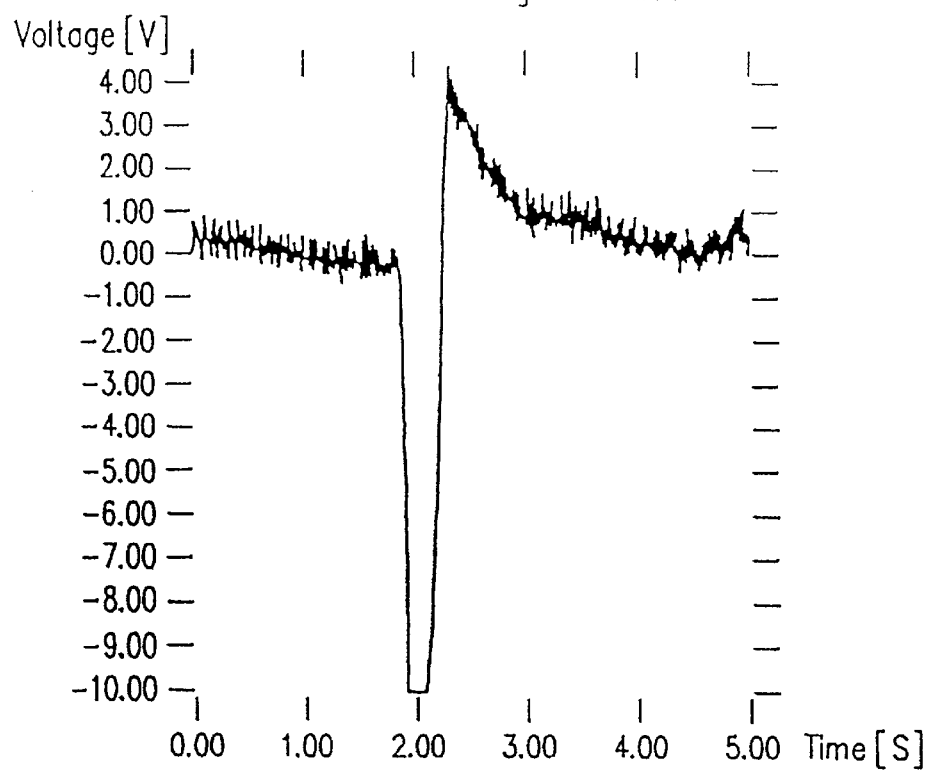
FIG. 5A is a graph showing an example of an output differentiated signal according to Examples 1 to 3 of the present invention.
Figure 5B:
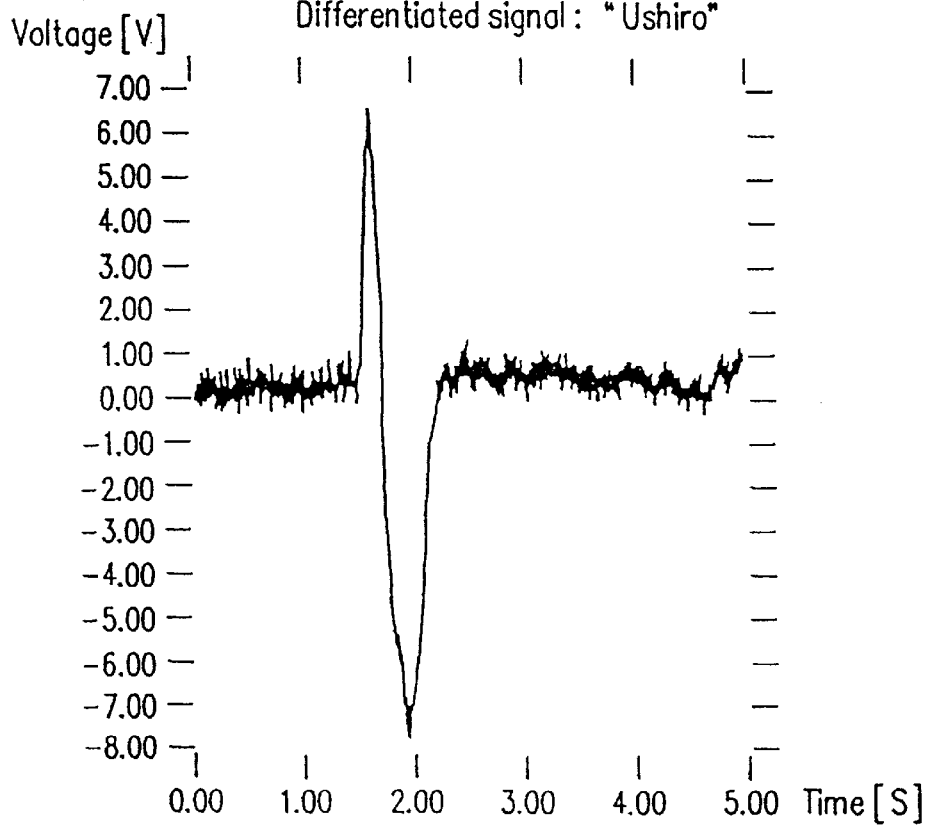
FIG. 5B is a graph showing another example of an output differentiated signal according to Examples 1 to 3 of the present invention.

The lip movement signal 13 from the image input section 3 is input to the speech period detection section 4. FIG. 3 shows a configuration for the speech period detection section 4 of the present example. As shown in FIG. 3, the voice recognition section 4 includes a differentiation circuit 31 and a period detection section 32. The differentiation circuit 31 outputs a differentiated signal 33 representing the degree of change in the input lip movement signal 13. FIGS. 5A and 5B each show an exemplary waveform of the differentiated signal 33 obtained when light from the LED 21 is radiated on the lips of the speaker from the side (i.e., laterally). The differentiated signal 33 shown in FIG. 5A is obtained when the speaker has uttered "mae" (i.e., "forward"). The differentiated signal 33 shown in FIG. 5B is obtained when the speaker has uttered "ushiro" (i.e., "backward"). As seen from FIGS. 5A and 5B, when the differentiated signal 33 has a large amplitude, the speaker is speaking. Moreover, since the light from the LED 21 is radiated on the lips of the speaker from one side of the speaker (i.e., laterally), the pouting movement of the lips when the sound "u" of the command "ushiro" is uttered is reflected on the waveform of the differentiated signal 33. If the light from the LED 21 is radiated on the lips of the speaker from the front, the light is radiated exclusively on the face of the speaker so that the lip movement signal 13 and the differentiated signal 33 are free from noise due to any movement in the background.

The period detection section 32 receives the differentiated signal 33 and determines the amplitude of the differentiated signal 33, so as to detect the speech period of the speaker. The specific method for detecting speech periods is described with reference to FIG. 6.

When the level (amplitude) of the differentiated signal 33 exceeds a threshold amplitude value 51, the period detection section 32 determines that the differentiated signal 33 has emerged due to the speaker uttering a command, and defines a period during which the level of the differentiated signal 33 exceeds the threshold amplitude value 51 to be a speech period. In the example illustrated in FIG. 6, periods 1 and 2 are speech periods. Next, the period detection section 32 compares the intervals between adjoining speech periods with a predetermined threshold time length 52. The predetermined threshold time length 52 is used to determine whether or not a plurality of speech periods correspond to the same utterance by the speaker, that is, whether or not the speech periods are made continuously. If the interval between two speech periods is equal to or smaller than the threshold time length 52, the speech periods are determined to be one continuous speech period including that interval. The speech period detection section 4 outputs a speech period detection signal 14 thus indicating a continuous speech period. The threshold time length 52 and the threshold amplitude value 51 are prescribed to be appropriate values.

As described above, the speech period detection section 4 derives a period during which the speaker utters a command (i.e., "speech period") by detecting the strength and duration of the movement of the speaker's lips based on the differentiated signal 33.

Next, the operation of the overall judgment section 5 will be described. As shown in FIG. 4, the overall judgment section 5 includes a voice recognition time judgment section 41, an output judgment section 42 and an output gate 43. The voice recognition time judgment section 41 receives the voice recognition result 12, and transmits the time duration, during which the recognition result was output from the voice recognition section 2, to the output judgment section 42. The output judgment section 42 receives the speech period detection signal 14 from the speech period detection section 4 as well as the output from the voice recognition time judgment section 41. Now, the operation of the speech period detection section 42 will be described with reference to FIG. 7.

Based on the received speech period detection signal 14, the output judgment section 42 generates a speech period 72 for evaluation purposes (hereinafter referred to as the "evaluation purpose speech period 72") by adding a threshold time length 71 for evaluation purposes (hereinafter referred to as the "evaluation purpose threshold time length 71") in front of and after the speech period. Next, the output judgment section 42 determines whether or not the time duration for which the voice recognition result 12 was output from the voice recognition section 2 falls within the evaluation purpose speech period 72. If this time duration falls within the evaluation purpose speech period 72, the voice input to the voice input section 1 and recognized by the voice recognition section 2 is determined to have been uttered by the speaker. The judgment result by the output judgment section 42 is output to the control section 6 as a signal 15.

The evaluation purpose threshold time length 71 used for generating the evaluation purpose speech period 72 is prescribed while taking into consideration the time the voice recognition section 2 requires for performing the recognition process. This is because the time duration during which the voice recognition result 12 is output is used as a reference for determining whether the recognized voice originates from an utterance by the speaker.

When the signal 15 corresponding to a command input by the utterance by the speaker is thus obtained, the control section 6 controls the airship 7 by outputting a radio control signal in accordance with the input command.

Thus, according to Example 1, a speech period during which a speaker is uttering a command is detected based on the movement of the lips of the speaker during his/her utterance of the command. Any recognized voice is determined to have originated from either the speaker or otherwise (e.g., another person) based on the detected speech period. As a result, misrecognition due to the utterance by another person is prevented, thereby preventing the object to be controlled (e.g., an airship) from malfunctioning.

Accordingly, a game apparatus can be realized which can be operated by human voice, thereby allowing a natural operation by a speaker (an operator). Moreover, according to the present example, the movement of the lips of the speaker is detected by using a simple configuration and method based on a combination of an LED and a photodiode. As a result, the game apparatus can be realized at very low cost as compared with a conventional game apparatus which captures an image of the lips of a speaker by means of a video camera or the like. It will be appreciated that the photodiode may be replaced with a phototransistor.

The circuit configurations shown in FIGS. 2 and 3 are just exemplary. The present invention is not limited to this specific configuration. Alternatively, the invention can be realized by utilizing computer software.

EXAMPLE 2

In accordance with a game apparatus of Example 2, a command is input based on the movement of the lips of a speaker (an operator of the game apparatus) alone, instead of any voice uttered by the speaker, so as to control an airship in accordance with the input command. Therefore, the game apparatus of the present example can be used in a noisy environment or under circumstances that do not allow easy utterance by a speaker (e.g., at midnight), and can be used by those who have speech impediments.

Figure 8:
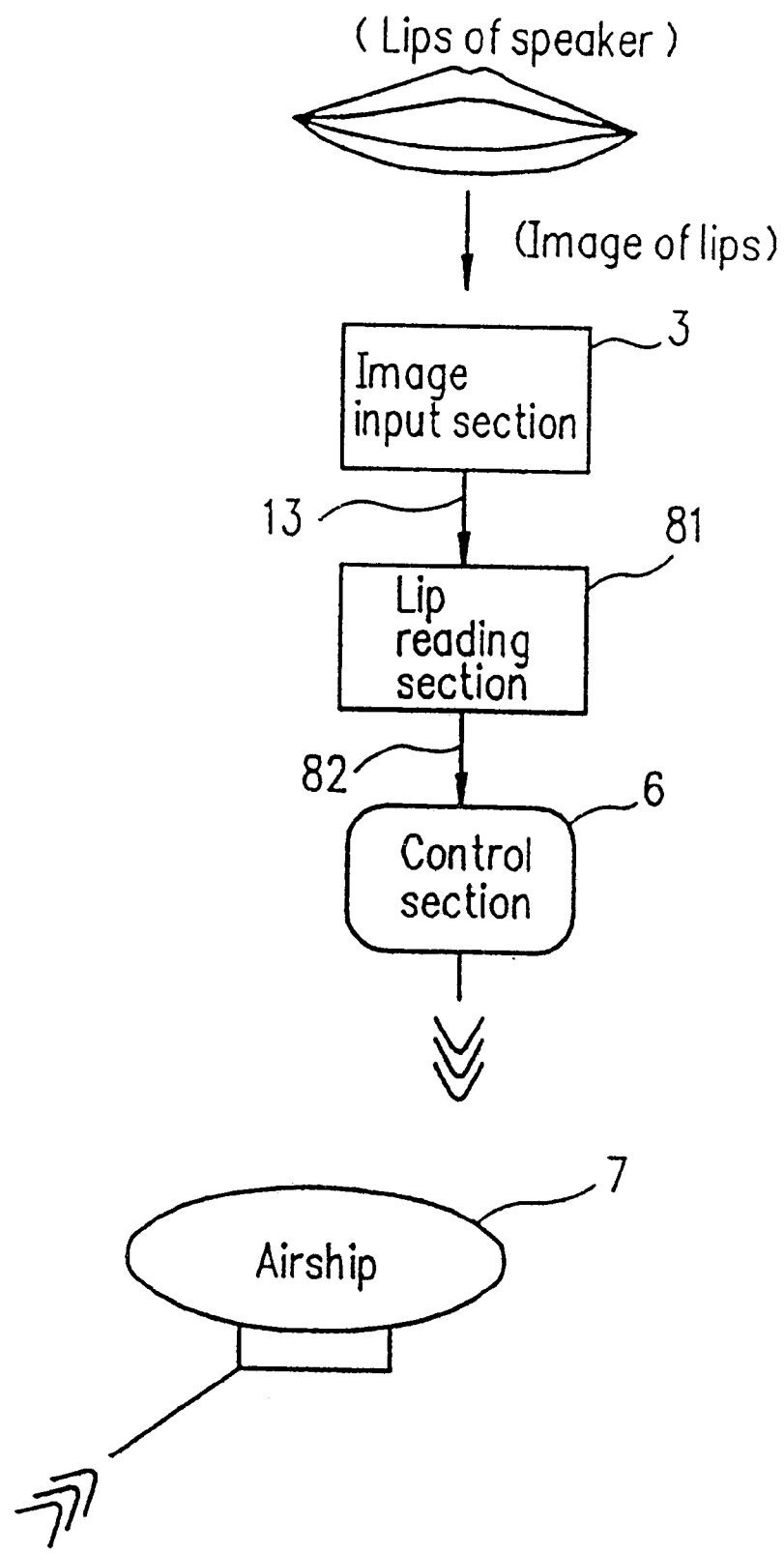
FIG. 8 is a block diagram showing a configuration for a game apparatus according to Example 2 of the present invention.

FIG. 8 schematically shows a configuration for the game apparatus of the present example. As shown in FIG. 8, the game apparatus of the present example includes an image input section 3, a control section 6, and an airship 7, as does the game apparatus of Example 1. The game apparatus further includes a lip reading section 81 for recognizing a word uttered by a speaker (operator).

Figure 9:
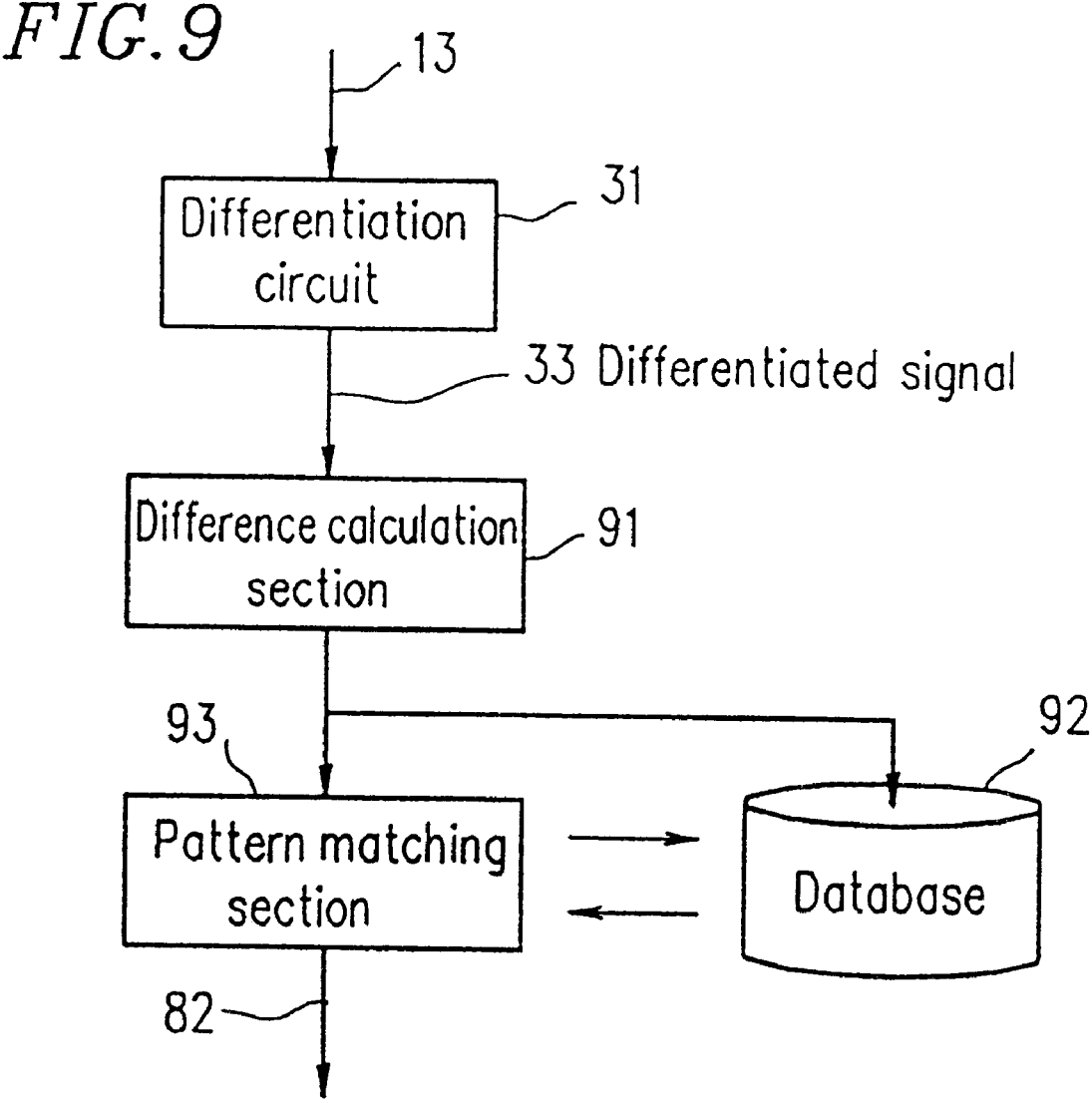
FIG. 9 is a block diagram showing a detailed configuration for a mouth/lip reading section according to Example 2 and a mouth/lip processing section according to Example 3 of the present invention.

FIG. 9 shows an exemplary configuration for the lip reading section 81. In the present example, the lip reading section 81 includes a differentiation circuit 31, a difference calculation section 91, a database 92, and a pattern matching section 93. The differentiation circuit 31 is identical with the differentiation circuit 31 incorporated in the speech period detection section 4 in Example 1.

The difference calculation section 91 samples a differentiated signal 33 output from the differentiation circuit 31 at a predetermined time interval to obtain a sampling data series containing a plurality of data samples, and then calculates a difference between the data samples. The result of the subtraction (hereinafter, referred to as "a series of difference data") is supplied from the difference calculation section 91 to both the database 92 and the pattern matching section 93. The database 92 stores difference data series of reference patterns (templates) to be used for the recognition. The pattern matching section 93 derives a difference in distance between a series of difference data of each reference pattern stored in the database 92 and the difference data series of an input pattern which is intended to be recognized. The pattern matching section 93 recognizes a word which has been input as a movement of the lips of a speaker based on the above-mentioned difference it derives. As will be appreciated, the reliability of the recognition increases as the above-mentioned difference decreases.

Hereinafter, the operation of the game apparatus in this example will be described in detail. In this example, the lip reading section 81 recognizes the input word by a comparison between the reference patterns and the input pattern, as described above. Accordingly, it is necessary to previously register reference patterns in the lip reading section 81, prior to the recognition operation.

(Operation for Registration)

First, the image input section 3 receives light emitted from an LED and then reflected from a lip region of a speaker (an operator), and outputs an electric signal 13 generated in accordance with the movement of the lips to the lip reading section 81. The electric signal 13 is input into the differentiation circuit 31 of the lip reading section 81. The differentiation circuit 31 sends a differentiated signal 33 representing the degree of change in the electric signal 13 to the difference calculation section 91. The operation up to this step is the same as that in Example 1.

Figure 10:
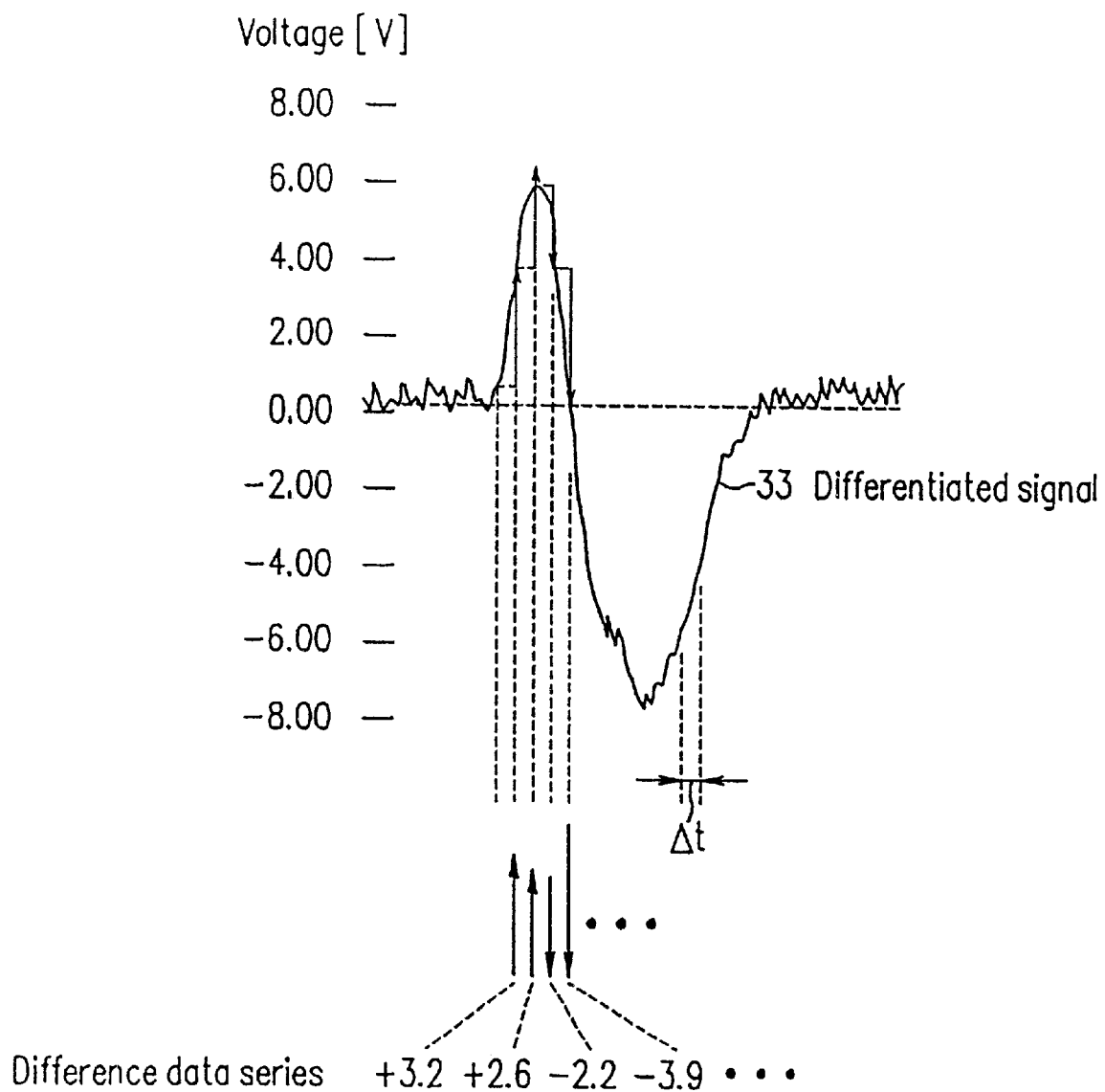
FIG. 10 is a diagram showing an operation of a differentiation circuit according to the present invention.

The operation of the difference calculation section 91 will be described with reference to FIG. 10. First, the difference calculation section 91 samples the differential signal 33 for a time interval (Δt). Then, the difference calculation section 91 calculates a difference between adjoining data samples in the obtained sampling data series. The calculated differences between respective data samples, i.e., a series of difference data is output to the database 92. The database 92 stores the difference data series. The operation is repeated a predetermined number of times. The number of repetitions is equal to the number of words (categories) to be recognized. Thus, difference data series for all categories are stored. The stored difference data series are held as reference patterns to be used for the recognition. In this example, the commands used for controlling the object are "Mae" (i.e. "forward"), "Ushiro" (i.e. "backward"), "Migi" (i.e. "right"), "Hidari" (i.e. "left"), "Ue" (i.e. "upward"), and "Shita" (i.e. "downward"). That is, six commands are used. Accordingly, the process for storing the difference data series is repeated 6 times, and finally, six reference patterns are held in the database 92.

When the registration of all reference patterns in the database 92 is completed in this way, the data-base 92 checks the respective difference data series, and extracts a period length in which data corresponding to a lip moving portion is continued with respect to each of the difference data series. Specifically, for example, if values which are closer to zero are continued for a predetermined time in the difference data series, the database 92 determines that the data corresponds to the period in which the lips do not move. When the period lengths corresponding to the lip moving portions are completely extracted for all of the reference patterns, a reference pattern having the maximum length is selected, and the maximum length is determined as a difference data series length (N) for the reference pattern. Thus, the registration is completed, and the difference data series of reference patterns are held in the database 92.

(Operation for Recognition)

The operation from the step of inputting the movement of the lip region to the step of obtaining the differentiated signal 33 is the same as that in the registration. Herein, the operation after the differentiated signal 33 is input into the difference calculation section 91 will be described with reference to FIG. 11.

Figure 11:
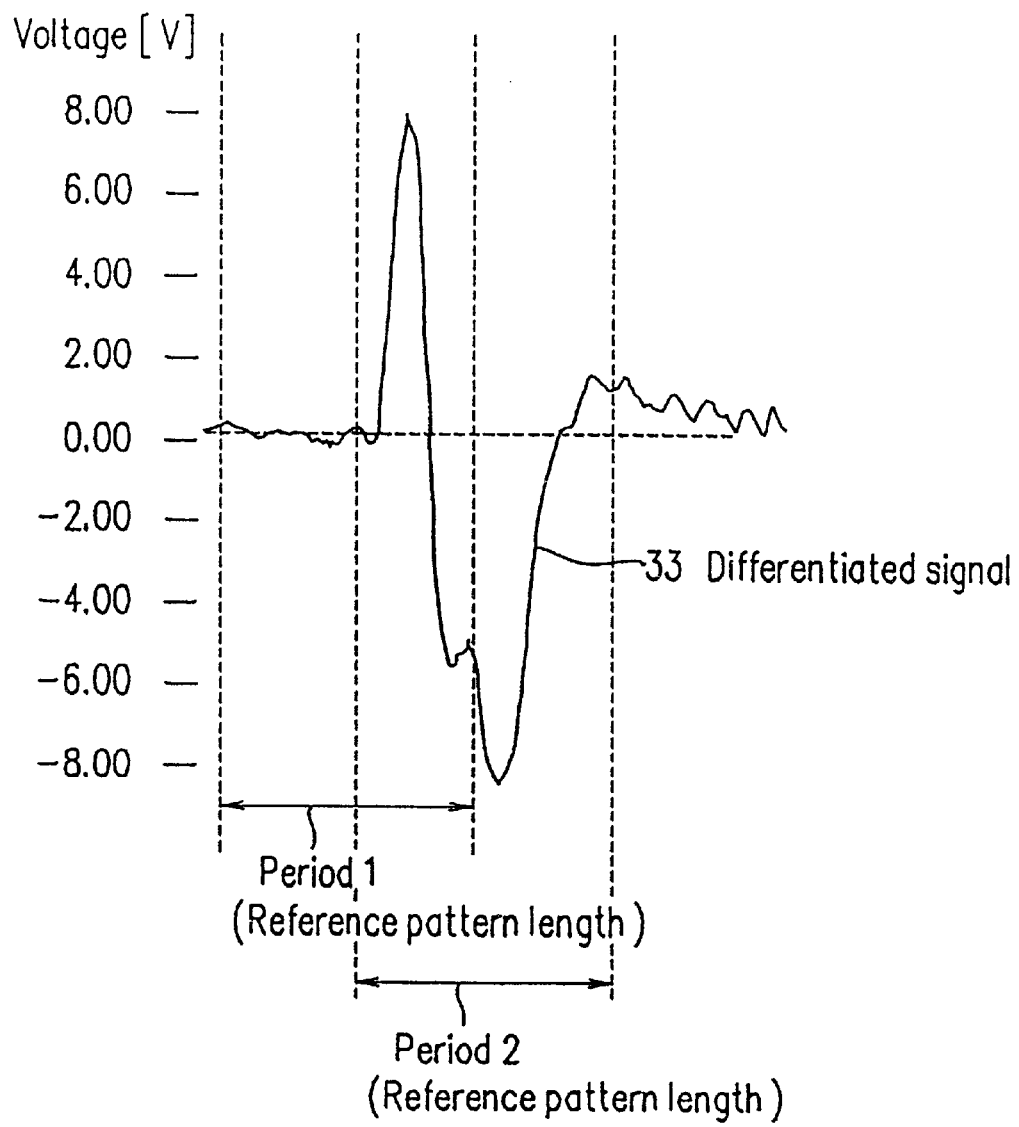
FIG. 11 is a diagram showing an operation of a pattern matching section according to Examples 2 and 3 of the present invention.

The differentiated signal 33 input in the difference calculation section 91 is sampled for a time interval (Δt), in the same way as in the registration. Then, for the data samples in the period having a length equal to the difference data series length (N) of the reference patten, a difference between adjoining data samples is calculated. The obtained series of difference data is treated as a difference data series of the period. The period for which the difference is to be calculated is forwardly shifted along a time axis by Δt. FIG. 11 only shows difference data series obtained for Periods 111 and 112. Period 111 is a period which begins with the first data sample and has a length of N, and Period 112 is a period which is forwardly shifted along the time axis by N/2 from Period 111.

When difference data series for a plurality of periods each having a length of N (hereinafter, these are referred to as recognition difference data series) are obtained, these recognition difference data series are fed to the pattern matching section 93. The pattern matching section 93 reads the reference pattern from the database 92, and obtains distances between the reference pattern and the respective one of the plurality of recognition difference data series. In this example, since six reference patterns are previously registered in the database 92 as described above, the pattern matching section 93 calculates distances from the respective reference patterns for each of the recognition difference data series.

A distance between a recognition difference data series and a reference pattern is calculated by using the following equation:

$$d_j = \sum_{i=1}^{N}(r_i - p_{ij})^2$$

In this equation, $r_i$ denotes the ith recognition difference data series, $p_{ij}$ denotes the jth reference pattern (corresponding to the jth category), $d_j$ denotes a distance between the recognition difference data series and the jth reference pattern. The pattern matching section 93 judges, when the distance $d_j$ is a predetermined value or less, that the recognition difference data series is matched with the jth reference pattern. Then, a signal 82 corresponding to the jth category (word) is output as the judgment result.

The judgment result is input into a control section 6. The control section 6 outputs a radio control signal corresponding to the jth category, so as to control an airship 7.

As described above, in this example, the input word (command) is recognized only based on the movement of the lips, and the airship is controlled in accordance with the recognized word. Therefore, the invention can be used in a noisy environment or under circumstances that do not allow easy utterance by a speaker, and can be used by those who have speech impediments.

The image input section 3 for inputting the movement of the lips is realized by the combination of an LED 21 and a photodiode 22 similar to Example 1, so that the game apparatus can be provided at very low cost, as compared with a conventional method in which a video camera or the like is used for capturing the image of the movement of lips.

In this example, the user of the game apparatus previously registers the reference patterns used for the recognition of commands, prior to the entry of commands. Alternatively, for example, reference patterns which can accommodate the movement of lips of any unspecified user are previously registered in the database 92 during the production process, the packaging process, or the like of the game apparatus, so that the operation of registration by the user can be omitted.

EXAMPLE 3

Next, a game apparatus in Example 3 of the invention will be described. In this example, a command is input by using both the voice and the movement of lips of a speaker (an operator), and the judgment is performed based on the combination of the recognition results. Thus, an airship is operated. Accordingly, it is possible to positively recognize the command uttered by the speaker even in a noisy environment.

Figure 12:
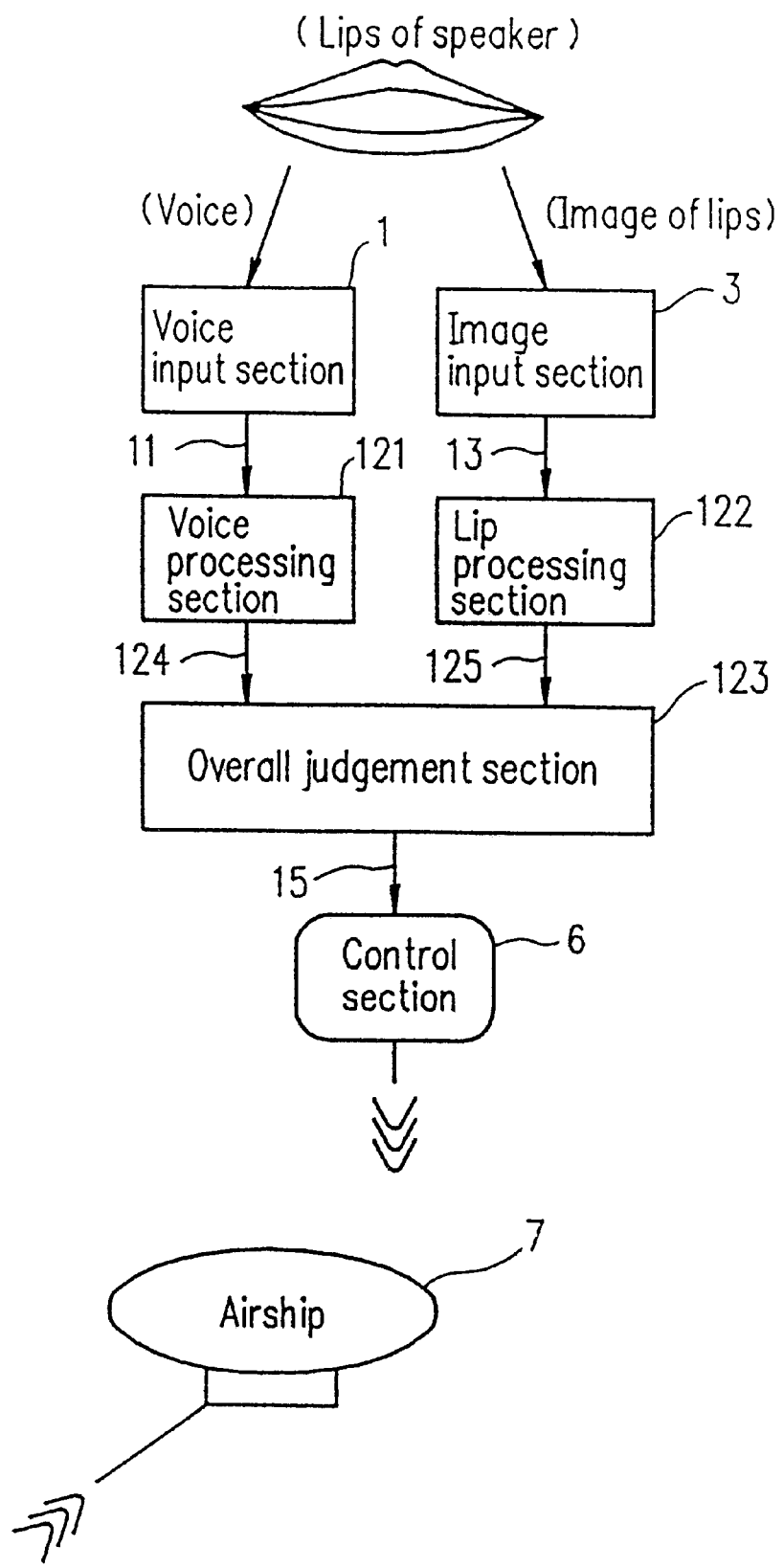
FIG. 12 is a block diagram showing a configuration for a game apparatus according to Example 3 of the present invention.

FIG. 12 schematically shows a configuration for the game apparatus of this example. The game apparatus of this example includes a voice input section 1, an image input section 3, a control section 6, and an airship 7, similarly to the game apparatus of Example 1. The game apparatus of Example 3 additionally includes a voice processing section 121 and a lip processing section 122. The voice processing section 121 recognizes the input voice in the same way as in the voice recognition section 2 in Example 1, and then calculates a degree of reliability for the recognition result. The lip processing section 122 recognizes the input word in the same way as in the lip reading section 81 in Example 2, and also calculates a degree of reliability for the recognition result. The outputs from the voice processing section 121 and the lip processing section 122 are both input into an overall judgment section 123. The overall judgment section 123 determines the command input by the speaker, based on the recognition results from the respective processing sections 121 and 122 and the degrees of reliability of the recognition results. Then, the overall judgment section 123 outputs the overall judgment result.

Hereinafter, the operation of the game apparatus of this example will be described in detail.

The step of inputting voice uttered by the speaker (the operator of the game apparatus) by the voice input section 1, and sending an electric signal 11 corresponding to the input voice to the voice processing section 121 is the same as that in Example 1. The voice processing section 121 receives the electric signal 11, and recognizes the input voice based on this signal. As a method for voice recognition, any method which is conventionally known can be used. Herein, for example in the same way as in the method used in the description of the lip recognizing section in the above-mentioned example, an electric signal 11 is obtained when each of the commands which may possibly be input is uttered, and the electric signal 11 is processed so as to obtain a data series. The data series is previously registered as a reference pattern. By calculating a distance between the data series to be recognized which is obtained by processing the electric signal 11 when the operator of the game apparatus actually utters a command, and all of the reference patterns which are previously registered, the contents of the command input through the voice input section can be recognized. After the voice is recognized in the above-described manner, the voice processing section 121 obtains a degree of reliability indicating how the recognized result is reliable. Then, both the voice recognition result and the degree of reliability are applied to the overall judgment section 123 as the output 124. How the degree of reliability is obtained will be described later.

In parallel to the processing of the input voice, the processing of a signal indicative of the movement of lips is performed. First, the image input section 3 inputs the movement of lips of the speaker in the same way as in Example 1, and outputs an electric signal 13 having a level which varies depending on the movement of the lips. The lip processing section 122 receives the electric signal 13, and performs the same processing as that in Example 2. In this example, when the recognition difference data series is judged to be matched with the jth reference pattern as the result of the pattern matching between the recognition difference data series and the reference patterns, the lip processing section 122 calculates a degree of reliability of the recognition result, based on the distance di between the recognition difference data series and the jth reference pattern. The thus obtained recognition result and the degree of reliability are both output to the overall judgment section 123.

Next, a method for calculating a degree of reliability is briefly described. In this example, the degree of reliability for the voice recognition result and the degree of reliability for the lip reading result are calculated using the same processing by processors having the same construction (not shown). Hereinafter, the calculation of a degree of reliability for the voice recognition result will be explained. Herein, a case where the degree of reliability for the voice recognition result is evaluated by using three ranks of "large", "middle", and "small" is considered. Note that the rank of "small" indicates that the reliability of the recognized result is highest, and the rank of "large" indicates that the reliability of the recognized result is lowest. In such a case, a threshold value $\alpha_L$ between the ranks of "small" and "middle", and a threshold value $\alpha_H$ between the ranks of "middle" and "large" are used ($\alpha_L < \alpha_H$), and the distance d between the reference pattern which is judged to be matched with the object to be recognized and the object to be recognized is compared with the threshold values. If the compared result is $d<\alpha_L$, the degree of reliability is judged to be the rank of "small". If the compared result is $\alpha_L \leq d < \alpha_H$, the degree of reliability is judged to be the rank of "middle". If the compared result is $d \geq \alpha_H$, the degree of reliability is judged to be the rank of "large". For the result recognized on the basis of the movement of lips, similarly, the rank of the degree of reliability is determined by the comparison with the threshold values. The threshold values used herein can be appropriately selected. The method for calculating the degree of reliability is not limited to that described herein. Alternatively, any known method can be applied.

Next, the operation of the overall judgment section 123 will be described with reference to FIG. 13.

Figure 13:
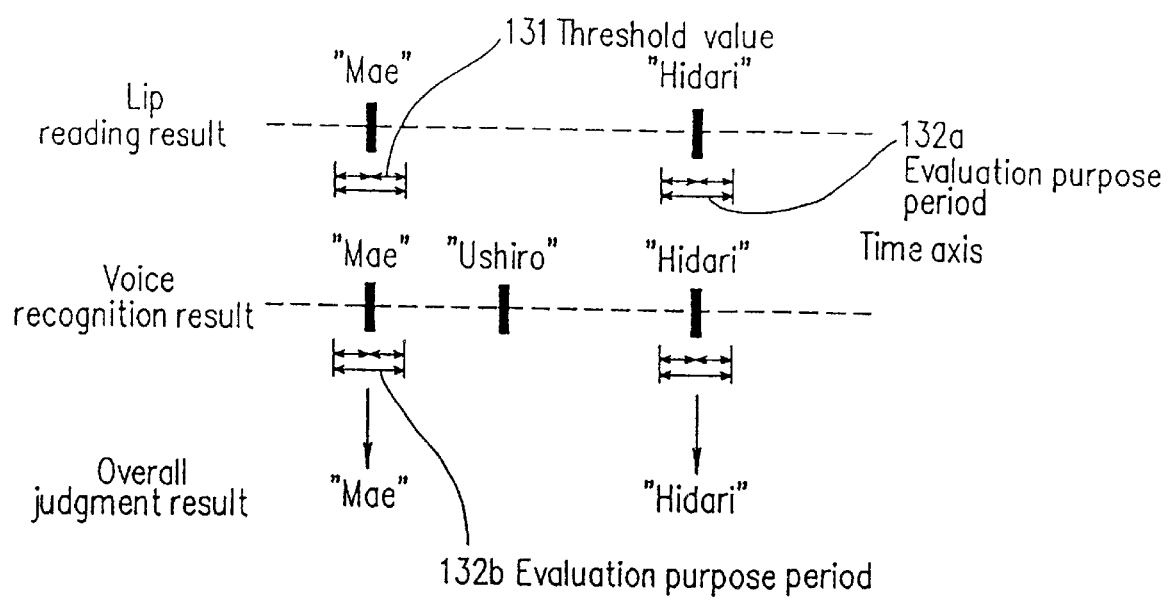
FIG. 13 is a diagram showing an operation of an overall decision section according to Example 3 of the present invention.

FIG. 13 is a diagram showing the concept of the overall judgment method. First, the overall judgment section 123 detects a time at which the voice recognition result is output from the voice processing section 121 (i.e., a time at which the output 124 is generated), and a time at which the lip reading result is output from the lip processing section 122 (i.e., a time at which the output 125 is generated). By adding a period corresponding to a predetermined threshold value 131 before and after the respectively detected output times, evaluation purpose periods 132a and 132b are produced. Then, whether the evaluation purpose period 132a for the lip reading result and the evaluation purpose period 132b for the voice recognition result are overlapped or not is determined. If the periods 132a and 132b are overlapped, the overall judgment section 123 determines that the voice uttered by the operator whose movement of lips is input is input and recognized. If the periods 132a and 132b are not overlapped, the recognized voice is judged to be the noise in the environment or the voice uttered by any person other than the operator. Accordingly, it is possible to prevent an erroneous recognition of voice uttered by any person other than the operator.

Next, the overall judgment section 123 determines whether the lip reading result is matched with the voice recognition result or not. If they are matched, the recognition results can be treated as the overall judgment result (the overall judgment result "Mae" (i.e. "forward") in FIG. 13). If they are not matched, the overall judgment result is determined depending on the degrees of reliability obtained for the respective recognition results. An exemplary relationship between the combination of the degrees of reliability for the recognition results and the overall judgment result determined depending on the combination is shown in FIGS. 14A and 14B. In this example, as described above, the evaluation is performed by using three ranks of "large" indicating the lowest reliability, "small" indicating the highest reliability, and "middle" indicating the immediate level of the reliability therebetween. FIG. 14A shows the relationship in the case where the degrees of reliability are equal to each other, and a priority is given to the voice recognition result, and FIG. 14B shows the relationship in the case where the degrees of reliability are equal to each other, and a priority is given to the lip reading result. Which recognition result is adopted is determined depending on the factors such as environmental conditions in which the game apparatus is operated. In some cases, which recognition result is adopted can be previously determined in the game apparatus. In some cases, the game apparatus is constructed so that which recognition result is adopted can be determined by the operator. For example, when the operator has no speech impediment and the game apparatus is used in a relatively low noise condition, the priority is given to the voice recognition result as in the case of FIG. 14A. When the operator has speech impediment or the game apparatus is used in a very noisy environment, the case of FIG. 14B is adopted.

The overall judgment section 123 outputs the overall judgment result which has been determined in the above-described manner, as a signal 15. As a final step, the control section 6 outputs a ratio control signal in accordance with the judgment result, so as to control the airship 7.

As described above, according to this example, the movement of lips as well as the voice signal are recognized, and the recognition is overall performed using both of the recognition results, so that it is possible to positively recognize the word (command) uttered by the speaker in a noisy environment. At the same time, this example can attain an effect that a person having speech impediment can use the game apparatus with a voice control function. In addition, similarly to Examples 1 and 2, the movement of lips is detected by the combination of the LED 21 and the photodiode 22, so that the game apparatus can be realized at very low cost, as compared with the conventional method in which a video camera or the like is used for capturing an image of movement of lips. Although the detailed description is omitted in this example, the user of the game apparatus registers the reference patterns for the lip reading, in the same way as in Example 2. Alternatively, reference patterns which can accommodate to any unspecified person are prepared, and the registration by the user can be omitted.

In Examples 1 to 3, a game apparatus which controls the airship 7 by a radio control signal is exemplarily described. It is appreciated that a game apparatus to which the invention is applicable is not limited to the specific type of game apparatus. For example, if the configuration described in any one of the above-described examples is provided for each of operators, a game apparatus which can be simultaneously operated by a plurality of operators can be realized.

Hereinafter, the input device of the invention will be described. FIG. 15 is a diagram schematically showing a configuration for the input device of the invention. The input device of the invention includes a head set 154, a supporting bar 155 attached thereto, and a stage 153 provided with a photodiode 151 and an LED 152. The stage 153 is joined to the supporting bar 155 at a predetermined angle (see FIG. 15A). By appropriately adjusting the angle between the stage 153 and the supporting bar 155, it is possible to change the direction of light emitted from the LED 152 with which the lip region of the operator is irradiated. The input device irradiates the lip region of the operator with the light emitted from the LED 152, and detects the reflected light by the photodiode 151, so as to input the movement of lips. Such an input device can be used as the image input section in Examples 1 to 3 described above. If a microphone 156 is additionally provided on the stage 153 (see FIG. 15B), the input device can be used as a voice input device.

The input device in which a microphone is not provided as shown in FIG. 15A can be used as the image input section in Example 2. The input device in which a microphone is provided as shown in FIG. 15B can be used as a device functioning as the voice input section and the image input section in Examples 1 and 3.

As described above, the input device of the invention utilizes the photodiode 151, the LED 152, and the microphone 156 which are very small in size and very light in weight, so that the size and the weight of the whole input device is very small and very light. In addition, the used components are all inexpensive, so that the whole input device can be produced at low cost. In addition, the input device of the invention is fixed on the head of the operator by means of the head set 154, so that the relative positional relationship between the lip of the operator and the photodiode 151 and the LED 152 can be substantially fixed. Therefore, the movement of lips can be stably input. Moreover, in the input device of the invention, the light is used for inputting the movement of lips, and the reflected light is converted into an electric signal and output. Therefore, the input device can have a simplified configuration, as compared with an input device which inevitably has a large and complicated configuration such as a device for inputting images instead of the movement of lips or a device utilizing ultrasonic waves.

Herein, the input device is provided with a single photodiode and a signal LED. Alternatively, it is possible to provide a plurality of photodiodes and a plurality of LED's. For example, if two sets of LED and photodiode are prepared, and the sets are disposed in a cross-like arrangement, a moving direction on a plane can be detected.

As described above, according to the invention, a natural operation can be performed by human voice, and the game apparatus does not require proficiency in the operation. In addition, the input word (command) is recognized not only by voice, but also by the movement of lips, so that a stable operation can be realized even in a noisy environment. Moreover, the movement of lips is detected by the combination of the LED and the photodiode (a phototransistor), so that the whole device can be produced at low cost, as compared with the case where a video camera, ultrasonic waves, or the like is used.

Furthermore, as described in Example 1, the speech period of the operator is detected by the movement of lips, and the period is used for the recognition of voice, so that it is possible to prevent an erroneous recognition of voice uttered by a person other than the operator. As described in Examples 2 and 3, if the input word (command) is recognized based on the movement of lips, and the airship is controlled by the recognition result, the invention can be used in a noisy environment or under circumstances that do not allow easy utterance by an operator, and can be used by those who have speech impediments.

In the input device of the invention, an inexpensive light emitting diode (an LED or the like) and an inexpensive photodetective device (a photodiode or the like) are attached on the light head set, the supporting bar, and the stage. Therefore, an input device which is very light in weight and very inexpensive can be realized.

In Examples 1 to 3, an exemplary case where the motion of the object is controlled in accordance with the recognized voice or the movement of lips is described. However, the operation of the object controlled by the voice or the movement of lips is not limited to the motion. For example, other operations such as returning some words can be controlled. Various types of apparatus for allowing the object to perform any operation (including the movement operation) in accordance with the recognized voice will be described below.

Hereinafter, examples of apparatuses for allowing the object to perform any operation in accordance with the recognized voice will be described.

EXAMPLE 4

In this example, an apparatus which selects, in response to the recognized voice, one output voice set from a group of output voice sets which are prepared for the recognized voice, and output the selected output voice will be described.

FIG. 16 schematically shows a configuration for a voice selection apparatus 100 of this example. The voice selection apparatus 100 includes a random-number generating section 101, a selection section 102, an input/output state memory 103, a state change section 104, and an input/output state database 105. The input/output state database 105 previously stores a plurality of input/output state tables. Each input/output state table includes an input x (x is an integer which is not negative) in a state s, and a group sp(x, i) of n output words for the input x ($0 \leq i < n(s)$). Exemplary input/output state tables are shown in FIGS. 17A and 17B. Initially, a table 201 in an initial state as shown in FIG. 17A is stored in the input/output state memory 103. The random-number generating section 101 determines a value i used for selecting one word to be output as voice from the group of the output words.

Hereinafter, the operation of the voice selection apparatus 100 will be described. When an input x is externally input into the selection section 102, the selection section 102 makes a reference to the input/output state tables stored in the input/output state memory 103, and selects the output word group sp(x, i) corresponding to the input x. Then, the selection section 102 allows the random-number generating section 101 to generate a random number r(n(s)) (where $0 \leq r(n(s)) < n(s)$), and determines that i=r(n(s)), so as to select one word from among the output word group sp(x, i). Then, the selected output word is externally output as voice.

The output word from the selection section 102 is not only externally output, but also output to the state change section 104. When the output from the selection section 102 is received, the state change section 104 makes a reference to the input/output state database 105, and changes the contents of the input/output state memory 103 to the input/output state table corresponding to the output word from the selection section 102. For example, when the word "Genki?" (i.e. "Are you fine?") is output as voice in the initial state 201, the state change section 104 makes a reference to the input/output state database 105, and takes out a table in an input/output state 202 corresponding to the output "Genki?". The table for the taken-out state 202 is stored in the input/output state memory 103.

Figure 18:
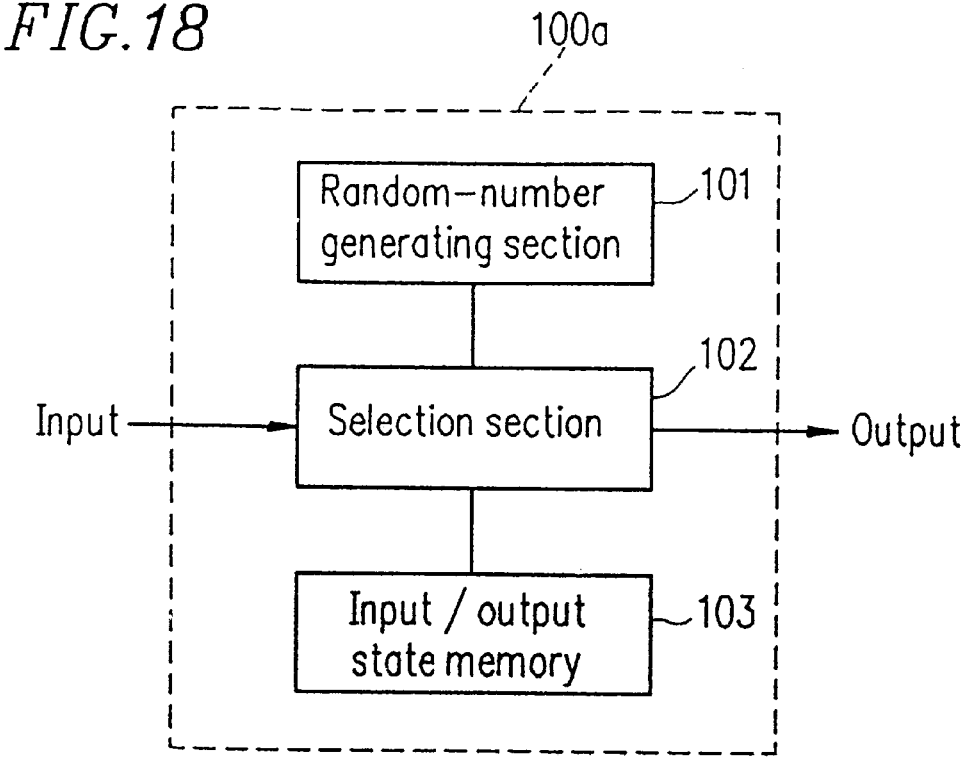
FIG. 18 is a diagram showing a configuration for a variant of a voice selection apparatus according to Example 4 of the present invention.

In this way, the voice selection apparatus 100 of this example outputs voice corresponding to the word selected by using a random number, in response to the input. Accordingly, a simple interactive-type system can be constructed by using the voice selection apparatus 100. In addition, if a voice selection apparatus 100a having a simplified construction in which the state change section 104 and the input/output state database 105 are omitted as shown in FIG. 18 is used, response can be performed only once for the input.

Figure 27:
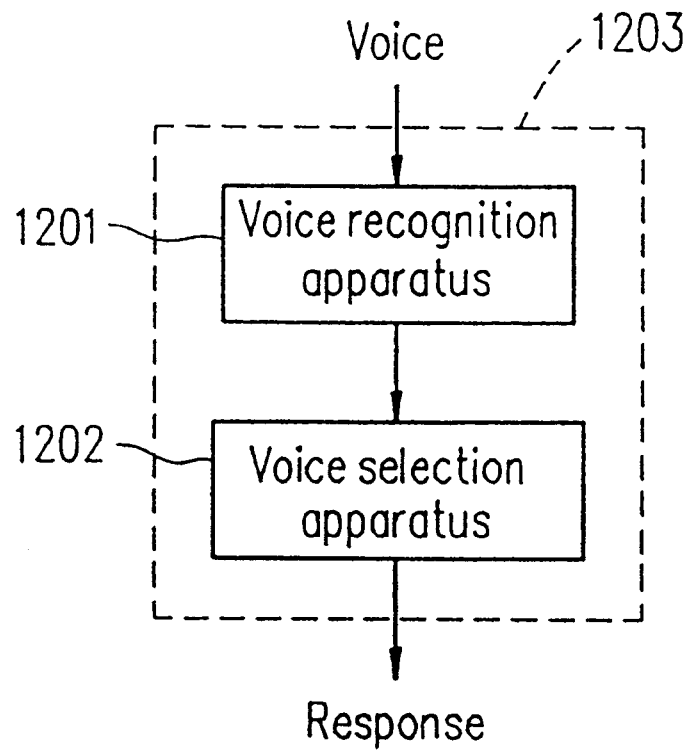
FIG. 27 is a diagram showing a configuration for a voice response apparatus incorporating a voice recognition apparatus and a voice selection apparatus of the present invention.

The voice selection apparatuses 100 and 100a can be used as a voice selection apparatus 1202 of a voice response apparatus as shown in FIG. 27, and can be used in conjunction with a voice recognition apparatus 1201. More specifically, when voice is first recognized by the voice recognition apparatus 1201, the recognition result is input into the voice selection apparatus 1202 together with an identification number added to the voice, for example. The voice selection apparatus 1202 regards the input identification number as the input x and selects at random one word from a group of output words. Then, voice corresponding to the selected word is generated. Accordingly, a voice response apparatus 1203 can be realized. In the voice response apparatus 1203, when some voice is input, voice in response to the voice is output. Moreover, in such a voice response apparatus 1203, various kinds of responses can be performed for the same input voice. For example, when the voice recognition apparatus 1201 outputs the voice "Ohayo" (i.e. "Good morning") as the recognition result in the initial state of the voice selection apparatus 1202, an identification number 1 applied to the voice "Ohayo" is input into the voice selection apparatus 1202 as the input x (see FIG. 17A). In response to the input x, the voice selection apparatus 1202 selects at random one word from a group sp(1, i) including two output words "Ohayo" and "Genki?" (i.e. "Are you fine?"), and generates voice corresponding to the selected word.

In the voice response apparatus 1203, prior to the actual operation, it is necessary to register voice which can be accepted as an input by the voice selection apparatus 1202. If the voice, corresponding to a word which is not included in the registered group of input words, is input to the voice selection apparatus 1202, for example, voice "Nani?" (i.e. "What?") may be output from the voice selection apparatus 1202. In the case where the apparatus in Example 3 is used as the voice recognition apparatus 1201, voice which is used for requiring the operator to input the voice again when the reliability of the recognized voice is low can be output from the voice selection apparatus 1202.

As described above, in the voice selection apparatus of the invention, a plurality of tables representing the input/output states are prepared, and the input/output state is changed in accordance with the history of the previous inputs and outputs. Accordingly, if the voice selection apparatus of the invention is used, it is possible to realize an apparatus capable of performing simple interaction. In addition, in the voice selection apparatus, a plurality of output word candidates are prepared for one input voice, and one is selected at random from the plurality of word candidates. Then, voice corresponding to the selected word is generated. As a result, a voice response apparatus which does not perform the same response to one input, but can offer various types of responses to one input can be provided.

EXAMPLE 5

Next, a direction detection apparatus and a direction selection apparatus of the invention will be described.

Figure 19:
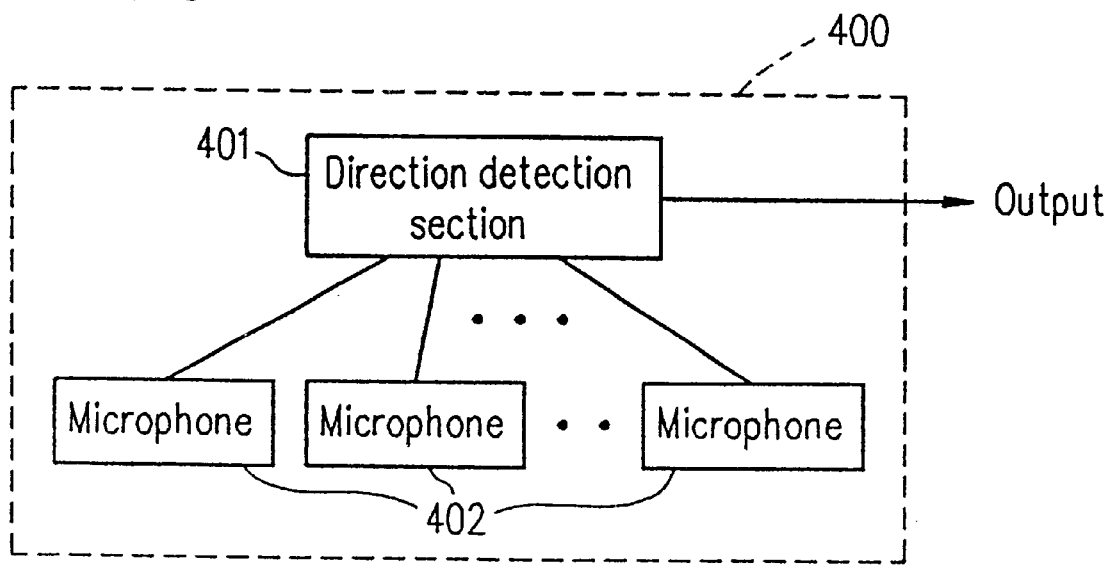
FIG. 19 is a diagram showing a configuration for a direction detection apparatus according to Example 5 of the present invention.
Figure 20:
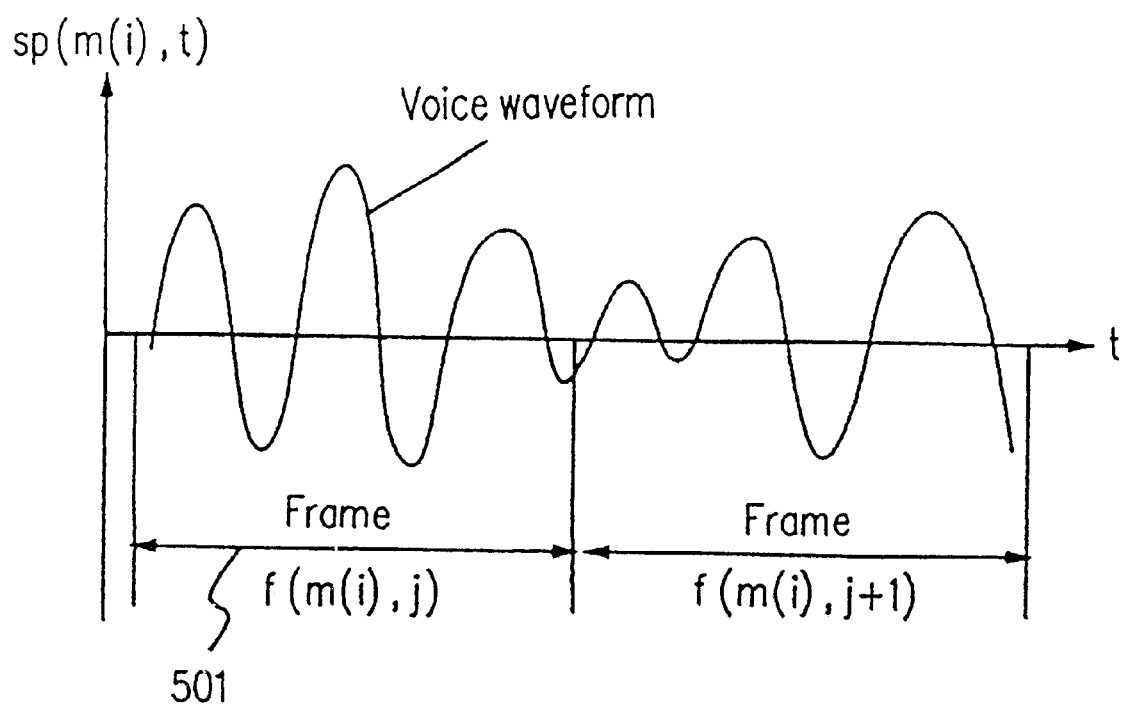
FIG. 20 is a diagram for describing the waveform of input voice and a frame.

First, the direction detection apparatus 400 is described with reference to FIG. 19. The direction detection apparatus 400 includes a direction detection section 401 and a plurality of microphones 402 connected thereto. The microphones 402 are attached to the object to be controlled. Herein, it is assumed that four microphones are provided, and the operation of the direction detection apparatus 400 is described. When voice is input through the four microphones m(i) (i=0, 1, 2, 3), the direction detection section 401 divides the input voice sp(m(i), t) into frames f(m(i), j) 501 ($0 \leq j$), as shown in FIG. 20. For example, the length of one frame is set to be 16 ms. Next, the direction detection section 401 obtains a voice energy e(m(n), j) in each frame, and the obtained energy e(m(n), j) is sequentially stored in a circulation memory (not shown) having a length l (e.g. a length of 100). At this time, the direction detection section 401 obtains the sum of energies for one previous frame for each microphone every time when the energy of one frame is stored, and determines which microphone has the maximum sum of energies. Then, the direction detection section 401 compares the maximum sum of energies with a threshold value The which is previously and experimentally determined. If the maximum sum of energies is larger than the threshold value The, it is determined that the direction from the direction detection section 401 to the microphone equals to the direction in which the voice is originated. The number i of the determined microphone is output from the direction detection section 401 as the voice input direction.

Figure 28:
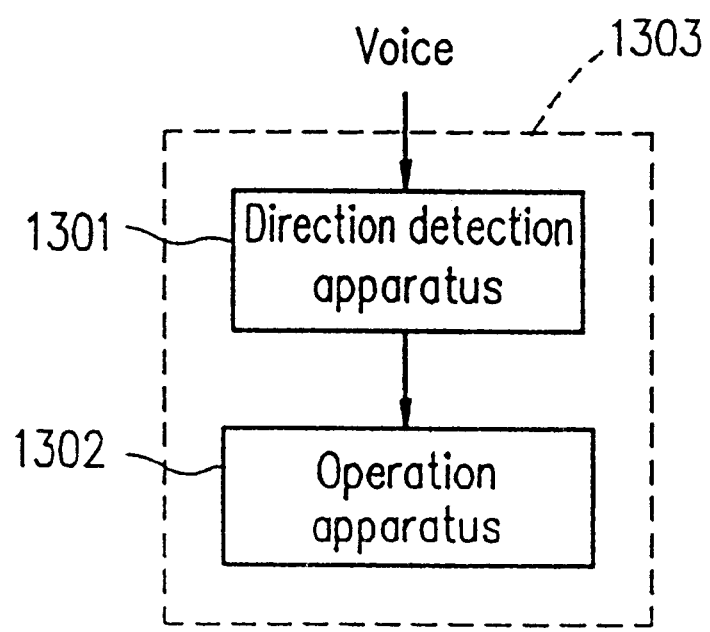
FIG. 28 is a diagram showing a configuration for a voice response apparatus incorporating a direction detection apparatus and an operation apparatus of the present invention.

If the direction detection apparatus 400 which operates as described above is used in conjunction with the operation apparatus 1302 as shown in FIG. 28, for example, a voice response apparatus 1303 which performs a predetermined operation in accordance with the direction in which the voice is originated can be constructed. Specifically, for example, if an object (e.g. a balloon or a stuffed toy) is attached with the operation apparatus 1302 for operating the object and the direction detection apparatus 1301 (400 in FIG. 19), the object is moved or faced in the direction in which the voice is originated. Thus, an apparatus which performs, in response to voice, a predetermined operation toward the direction in which the voice is originated can be produced.

An example of the above-described operation apparatus 1302 is an apparatus including three motors with propeller attached to the object and a driving apparatus for these motors. If a direction in which the object is intended to be moved is input, the apparatus controls the three motors for allowing the object to move in the direction.

Next, the direction selection apparatus is described with reference to FIG. 21. The direction selection apparatus 600 includes an offset calculating section 601, an azimuth compass 602, and a target direction memory 603. The direction selection apparatus 600 can be used as an apparatus for controlling the direction in which the object is to be moved, and/or the direction in which the object is to be faced. When an input x (x is an integer which is not negative) indicating the direction in which the object is to be moved, or the direction in which the object is to be faced is input, the offset calculating section 601 outputs an offset depending on the input x based on the table previously stored in the offset calculating section 601. The output offset is added to the actual direction of the object measured at that time by the azimuth compass 602, and then fed to the target direction memory 603. The target direction memory 603 stores the added result as the direction in which the object is to be moved or the direction in which the object is to be faced.

As described above, the direction selection apparatus in FIG. 21 is used for changing the direction of the object, on the basis of the direction in which the object is now being moved or the direction in which the object is now faced.

Figure 21:
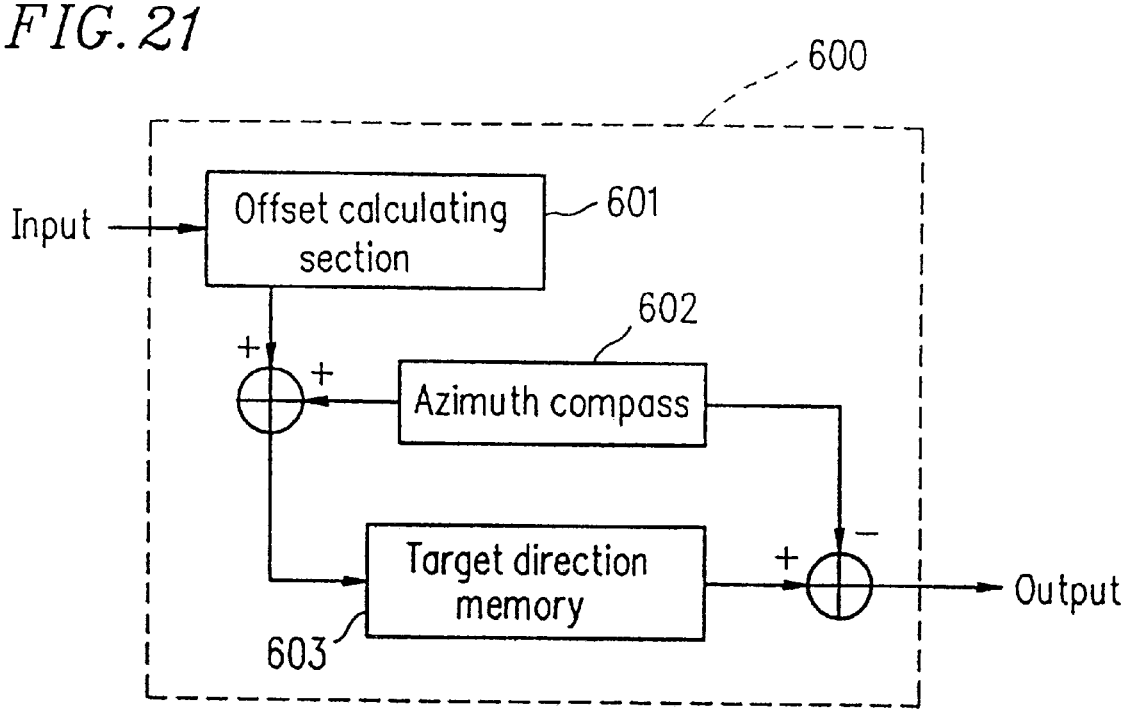
FIG. 21 is a diagram showing a configuration for a direction selection apparatus according to Example 5 of the present invention.
Figure 22:
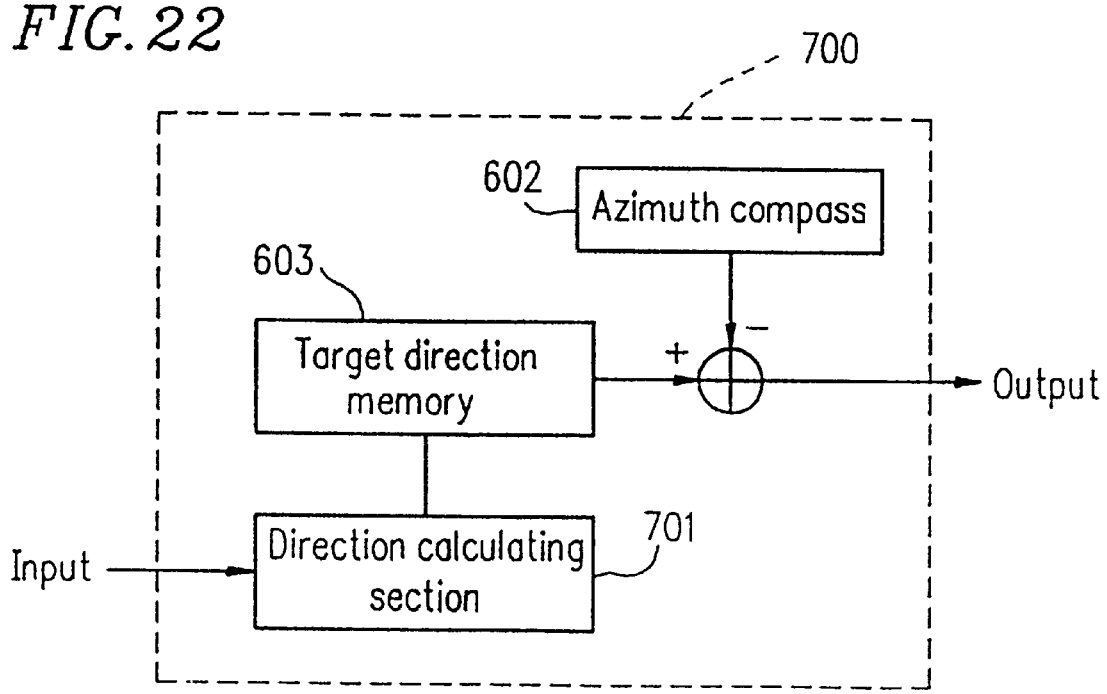
FIG. 22 is a diagram showing a configuration for another direction selection apparatus according to Example 5 of the present invention.

If a direction selection apparatus 700 shown in FIG. 22 is used instead of the direction selection apparatus 600 shown in FIG. 21, the direction of the object is not changed in a relative direction on the basis of the present direction, but the absolute direction can be changed. In the direction selection apparatus 700 in FIG. 22, a direction calculating section 701 externally receives an input x (x is an integer which is not negative) indicating the absolute direction (e.g. north), and then outputs a value corresponding to the input x. The output value is directly stored in the target direction memory 603 as the target direction. Similarly to the offset calculating section 601, the direction calculating section 701 can be realized by holding the values indicating the absolute values for the input x in the form of a table. After storing the target direction in the memory 603, the direction selection apparatus 700 sequentially measures the present direction during the movement of the object or the turning of the object by means of the azimuth compass 602. A difference between the measured direction and the direction stored in the target direction memory 603 is output. If a feedback control is performed for the object based on the output, it is possible to move the object in the target absolute direction or to turn the object in the target direction.

Figure 29:
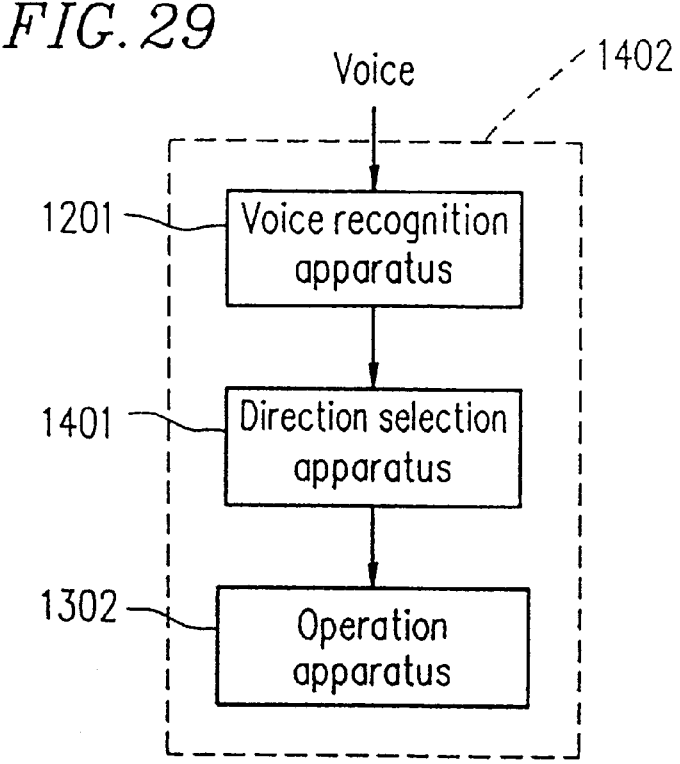
FIG. 29 is a view showing a configuration for a voice response apparatus incorporating a voice recognition apparatus, a direction selection apparatus and an operation apparatus of the present invention.

If the above-described direction selection apparatus is used in conjunction with the voice recognition apparatus and the operation apparatus, as shown in FIG. 29, a voice response apparatus 1402 can be realized. Any type of the voice recognition apparatus, for example, a conventional voice recognition apparatus and a voice recognition apparatus incorpoeated in the game apparatus of Examples 1 to 3, may be used in the voice response apparatus 1402. In the voice response apparatus 1402, when the facing direction or the moving direction of the object is input by voice, the facing direction or the moving direction of the object is changed in accordance with the input voice. In the voice response apparatus 1402, the recognition result of the voice recognition apparatus 1201 is used as the input of the direction selection apparatus 1401, and the output of the direction selection apparatus 1401 is used as the input of the operation apparatus 1302. Accordingly, the operation of the object can be controlled while the present facing direction or the moving direction of the object is compared with the target direction.

For example, the north direction is defined as a zero degree, and the rotation toward the east direction is defined as a positive direction. An example case in which the object is now faced in the 0-degree direction is considered. In this example, the direction selection apparatus 600 (see FIG. 21) is used as the direction selection apparatus 1401. In the case where a table in which the word "Migi" (i.e. "right") is related to +90 degrees is stored in the offset calculating section 601 of the direction selection apparatus 600, when the voice specifying the target direction is recognized as the word "Migi" by the voice recognition apparatus 1201, the direction selection apparatus 600 sends an output to the operation apparatus 1302. The output instructs the operation apparatus 1302 to change the facing direction or the moving direction of the object by 90 degrees in the east direction from the present direction. At this time, in the direction selection apparatus 600, the present facing direction or the present moving direction during the change of the direction is always compared with the target direction. The operation apparatus 1302 is controlled so that the facing direction or the moving direction of the object is changed to the target direction, by the output from the direction selection apparatus 600.

Alternatively, if the direction selection apparatus 700 shown in FIG. 22 is used as the direction selection apparatus 1401, instead of the word "Migi" or "Hidari", the word "Kita" (i.e. "North") or "Nansei" (i.e. "South west") indicating the absolute direction is input as the word indicating the target direction. At this time, the direction selection apparatus 700 stores the 0 degree for the input word "Kita", or stores the −135 degrees for the input word "Nansei" in the target direction memory as the absolute target direction, and the above-described operation is performed. The target direction is herein in the range of −180 degrees to +180 degrees.

Figure 30:
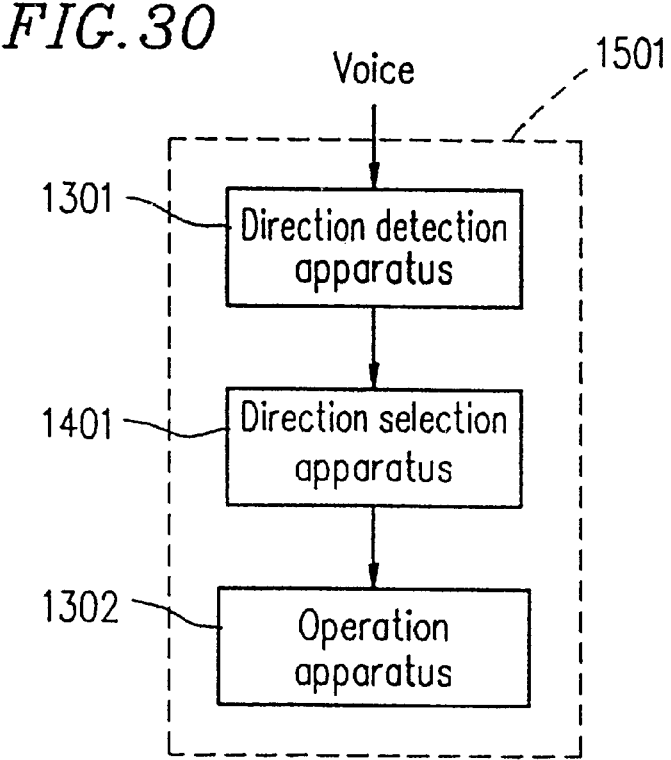
FIG. 30 is a diagram showing a configuration for a voice response apparatus incorporating a direction detection apparatus, a direction selection apparatus and an operation apparatus of the present invention.

The direction detection apparatus and the direction selection apparatus of this example can be combined with the operation apparatus. In such a case, as shown in FIG. 30, the detection result of the direction detection apparatus 1301 is used as the input of the direction selection apparatus 1401, and the output of the direction selection apparatus 1401 is used as the input of the operation apparatus 1302. Accordingly, a voice response apparatus 1501 in which the facing direction or moving direction of the object can be changed into the direction in which the voice is originated, while the present facing and moving direction of the object is compared with the target direction can be realized.

EXAMPLE 6

Figure 26:
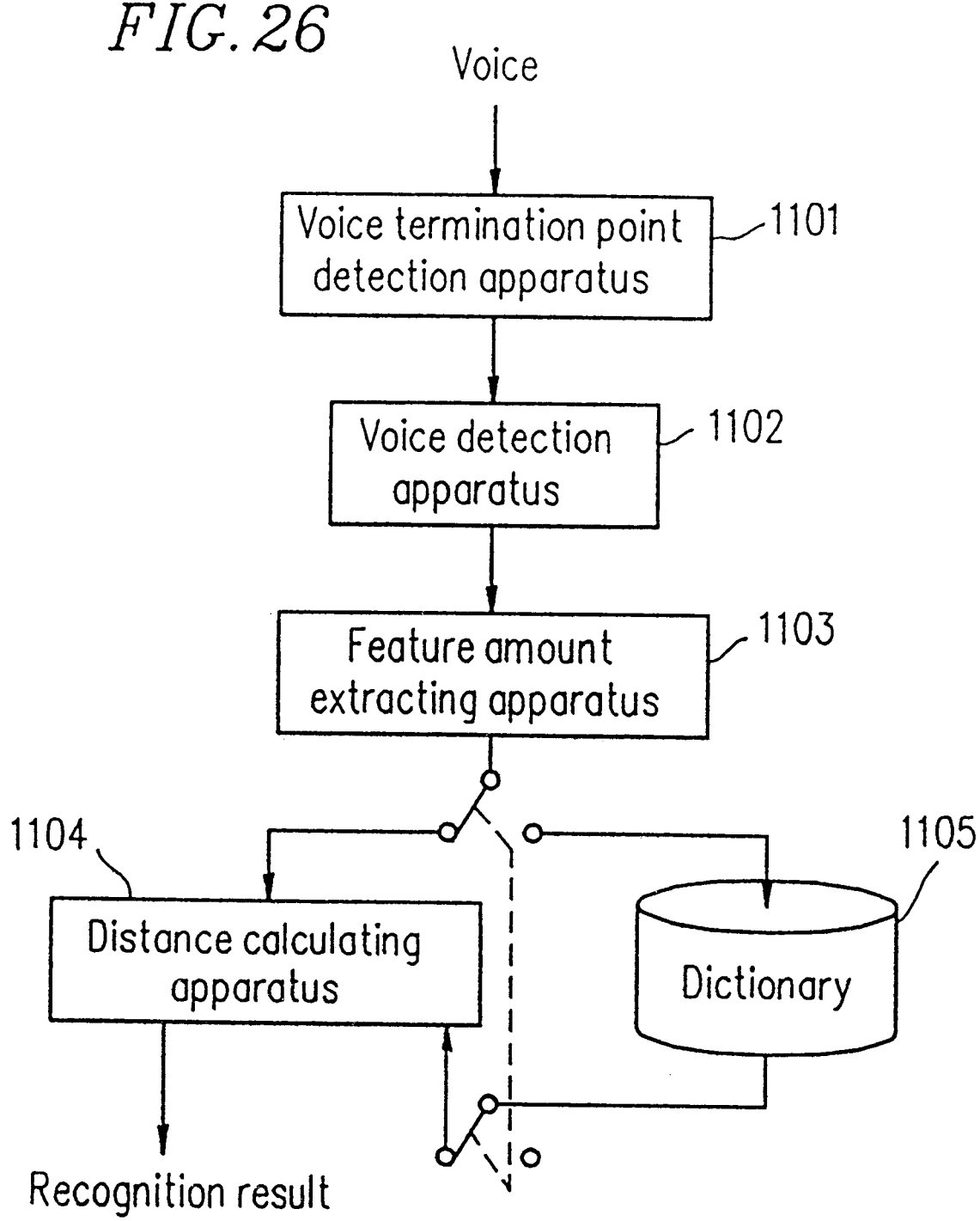
FIG. 26 is a block diagram showing a configuration for a voice recognition apparatus according to Example 6 of the present invention.

In this example, an apparatus related to voice recognition is described. The apparatus includes, as shown in FIG. 26, a voice termination point detection apparatus 1101, a voice detection apparatus 1102, a feature amount extracting apparatus 1103, a distance calculating apparatus 1104, and a dictionary 1105.

First, the voice termination point detection apparatus 1101 will be described. The voice termination point detection apparatus 1101 receives a signal corresponding to the input voice, and detects the voice termination point based on the signal. In this specification, the term "voice termination point" means a time at which the voice input is terminated.

Figure 23:
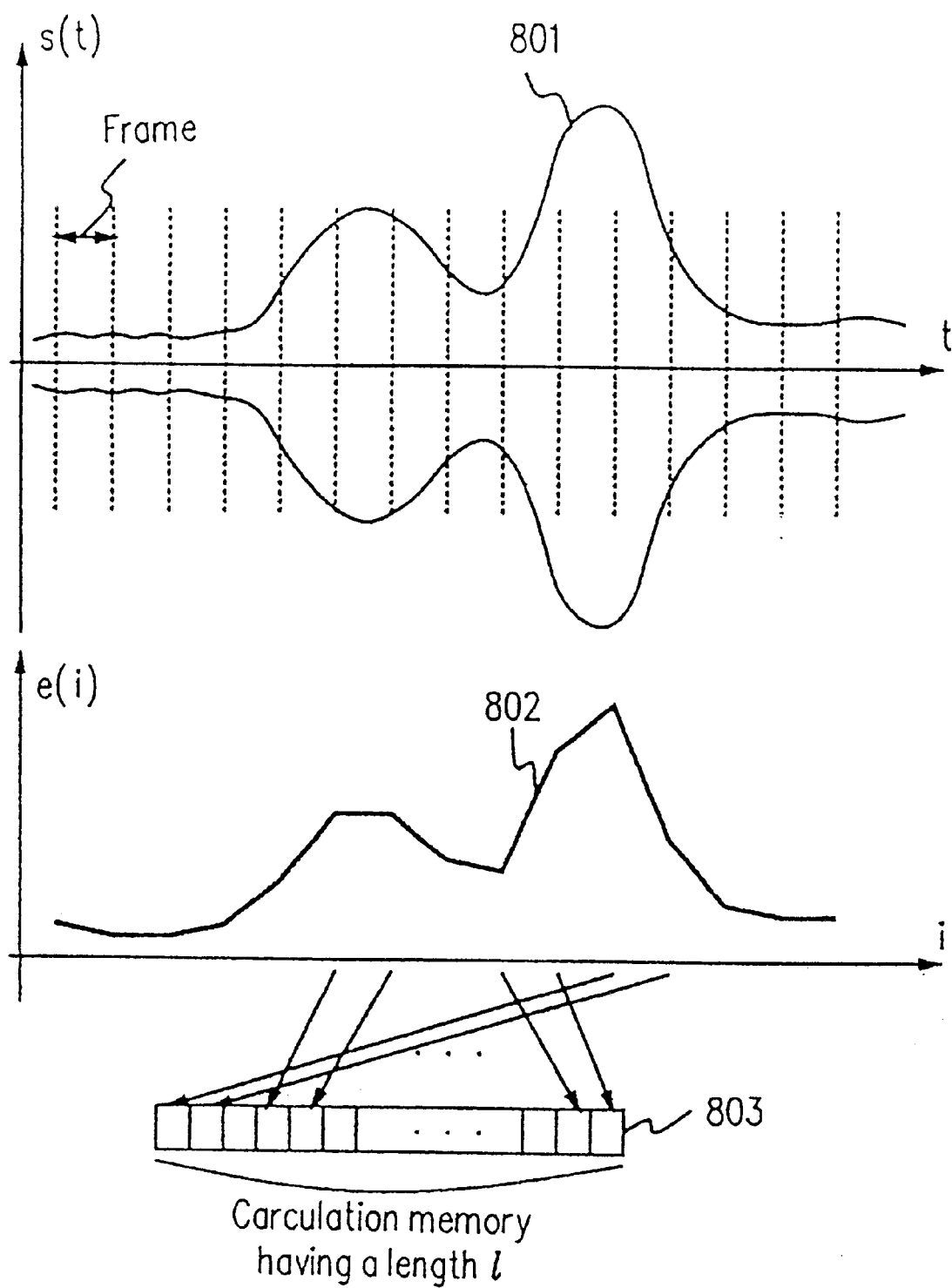
FIG. 23 is a diagram for describing a voice waveform, energy, and a circulation memory.

The voice termination point detection apparatus 1101 of this example is connected to a voice input apparatus such as a microphone. When voice s(t) is input through the voice input apparatus, the voice termination point detection apparatus 1101 divides the input voice s(t) into frames f(i) (i is an integer which is not negative), as shown in FIG. 23. Then, an energy e(i) in each frame is obtained. In FIG. 23, the voice s(t) is indicated by curve 801, and the energy e(i) is indicated by curve 802. Then, every time when the voice for one frame is input, the voice termination point detection apparatus 1101 obtains the variance of energy from the present frame to a frame which precedes the present frame by a predetermined number of frames, and compares the variance in energy with a threshold Thv which is previously and experimentally determined. As the result of the comparison, if the variance in energy crosses the threshold value Thv from the larger part to the smaller part, the crossing time point is determined as the voice termination point.

The method for obtaining the variance from the energy in each frame for a predetermined time period is described. First, a method utilizing a circulation memory is described. The energy obtained in each frame is sequentially stored in a circulation memory 803 having a length 1. Every time when the energy for one frame is obtained, the energy of a frame which precedes the present frame by a predetermined time period is referred to from the circulation memory 803, so as to obtain the variance.

There is another method for obtaining the variance of energy without using the circulation memory. In this method, the voice termination point detection apparatus 1101 stores a mean value m(i−1) and a variance v(i−1) for a predetermined number of preceding frames. Every time when an energy e(i) is obtained for a new frame, a weighted sum of the new energy e(i) and the mean value m(i−1) of the previous energies is replaced as a new mean value m(i) of energies. Similarly, a weighted sum of the previous variance v(i−1) and |e(i)−m(i)| is replaced as a new variance v(i). In this way, a pseudo variance of energy can be obtained. Herein, an attenuation constant a is used for the weighting, and a new mean value and a new variance are obtained on the basis of the following equation, where α is 1.02:

$$m(i) = \frac{m(i-1)}{\alpha} + \frac{\alpha - 1}{\alpha} e(i)$$

$$v(i) = \frac{v(i-1)}{\alpha} + \frac{\alpha - 1}{\alpha} |e(i) - m(i)|$$

In this way, the circulation memory is not required, so that memory can be saved. Also, the operation for obtaining the sum of energies for a predetermined time period every time when a new energy is obtained can be omitted, so that the processing time period can be shortened.

Figure 24:
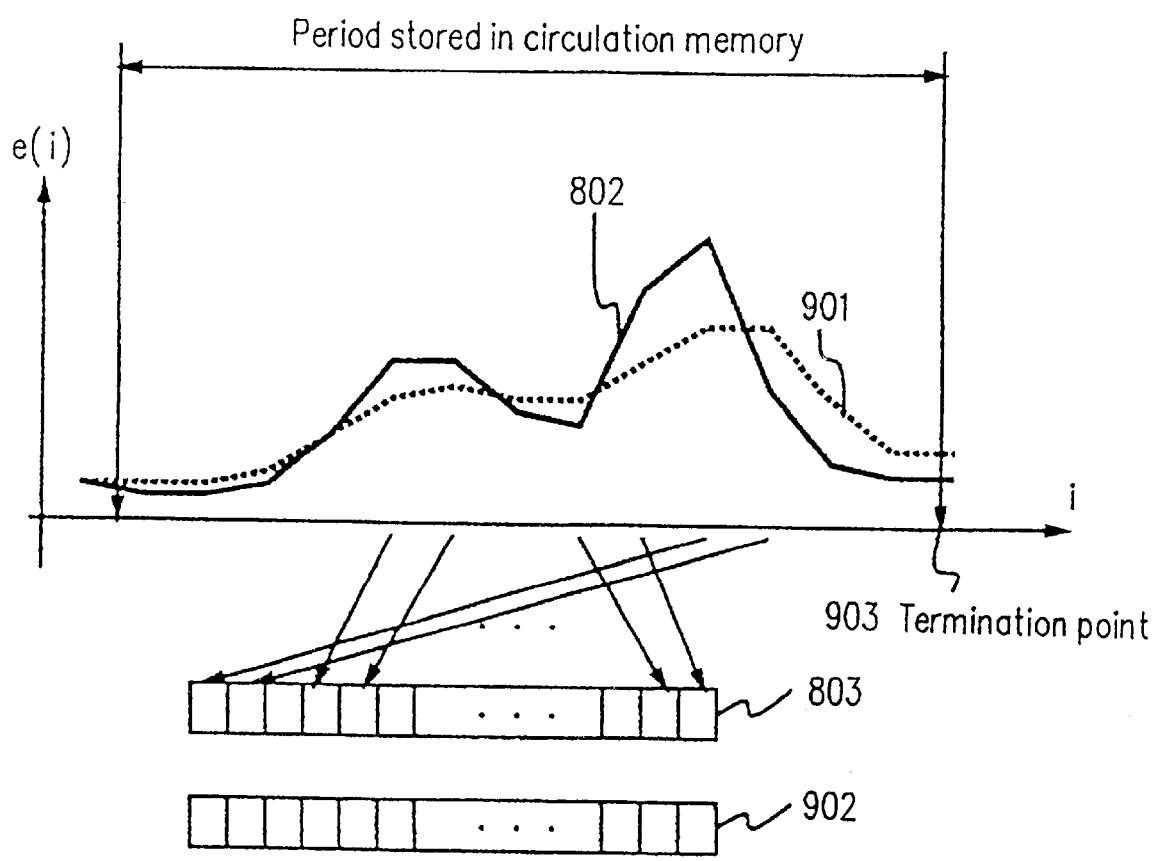
FIG. 24 is a diagram for describing a method for detecting a voice termination point according to Example 6 of the present invention.
Figure 25:
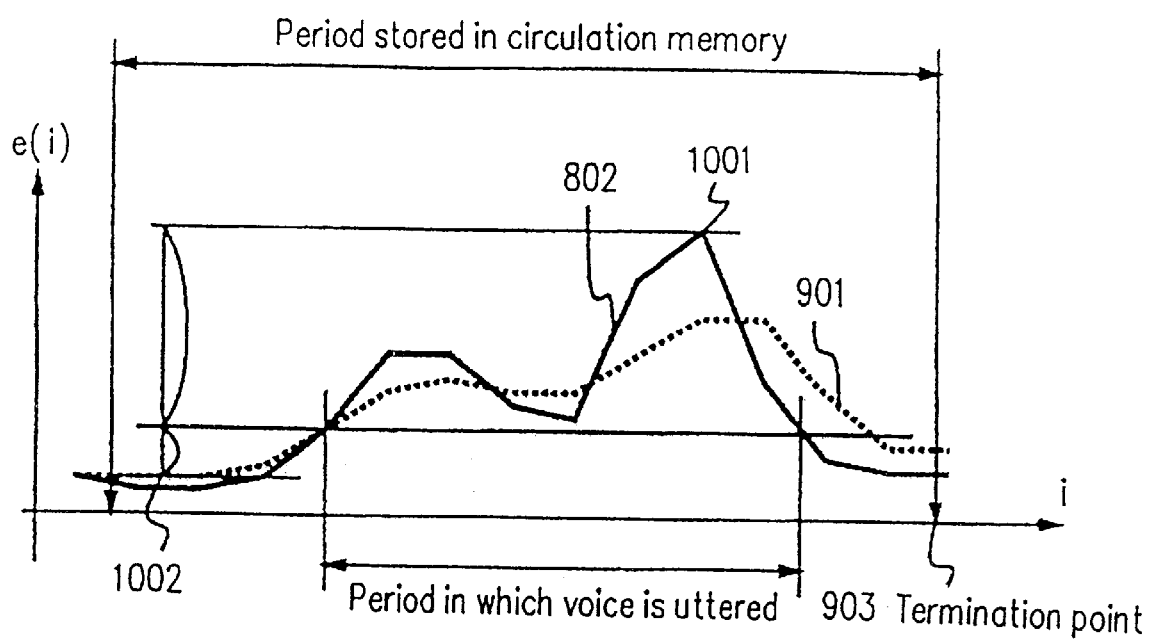
FIG. 25 is a diagram for describing a method for detecting voice according to Example 6 of the present invention.

Next, the voice detection apparatus 1102 for extracting a period in which the voice is actually uttered is described. For extracting the period, in addition to the circulation memory 803 for storing the energy, a circulation memory 902 for storing a smoothing energy is provided. As shown in FIG. 24, every time when an energy for one frame is obtained, the energy 802 is stored in the memory 803, and a smoothing energy 901 is stored in the memory 902. At the time at which the voice termination point 903 is obtained in the above-described manner, the history of energy and smoothing energy is left in these circulation memories 803 and 902. Thus, if the length of each of the circulation memories is set to be sufficiently large (e.g., a length corresponding to two seconds), the energy for one word can be left. The voice detection apparatus 1102 extracts the period in which the voice is actually uttered by using the energy and the smoothing energy stored in these memories.

The extraction of the period is performed in the following procedure. First, as described later, a threshold value Th is determined. The threshold value Th is sequentially compared with the energies stored in the circulation memory 803, from the old one to the new one. A point at which the energy first exceeds the threshold value is determined as a starting point of the period in which the voice is uttered. In a reversed manner, the comparison is performed from the new one to the old one. A point at which the energy first crosses the threshold value is determined as the termination point of the period in which the voice is uttered. In this way, the period in which the voice is uttered is extracted.

The method for determining the threshold value Th is described. First, the maximum energy max1001 in the memory 803 and the minimum smoothing energy min1002 in the memory 902 at the time at which the voice termination point is detected are obtained. By using these values, the threshold value Th is obtained on the basis of the following equation, where $\beta$ is a value of about 0.07:

$$Th = \min + \beta(\max - \min)$$

Herein, as a method for smoothing the energy, a method for adopting a median value in a fixed window is used. However, the smoothing method is not limited to this method. Alternatively, for example, a method for adopting a mean value can be used. In this example, the maximum smoothing energy is not used, but the maximum energy is used in order to obtain the threshold value Th. The reason is that, if the maximum smoothing energy is used for obtaining the threshold value Th, the maximum value is largely varied when the length of word is varied, and hence the threshold value Th is also varied. As a result, good voice detection cannot be attained. In addition, the minimum smoothing energy is used for calculating the threshold value Th, it is possible to prevent a noise which is not voice from being detected.

As described above, the voice detection apparatus 1102 performs the extraction of the period in which the voice is uttered, i.e., a portion corresponding to the voice in the input signal.

Next, the feature amount extracting apparatus 1103 extracts a feature amount used for recognition from the detected voice. As in the case of energy, the feature amount is obtained for each frame, and stored in the circulation memory. Herein, the "feature amount" is a feature-amount vector including three components, i.e., the zero crossing number of the original voice signal s(t), the zero crossing number of a differentiated signal of the original voice signal s(t), and a logarithm difference of the energy e(i) of the original voice signal s(t) between frames.

The feature-amount vector obtained through the voice termination point detection apparatus 1101, the voice detection apparatus 1102, and the feature amount extracting apparatus 1103 is input into the distance calculating apparatus 1104. The distance calculating apparatus 1104 checks each of a plurality of voice feature-amount vectors previously registered in the dictionary 1105 against the input feature-amount vector, and outputs the checked result with the highest score as the recognition result. As the checking method, an Euclidean distance between vectors is simply obtained, or a DP matching method can be used.

Figure 31:
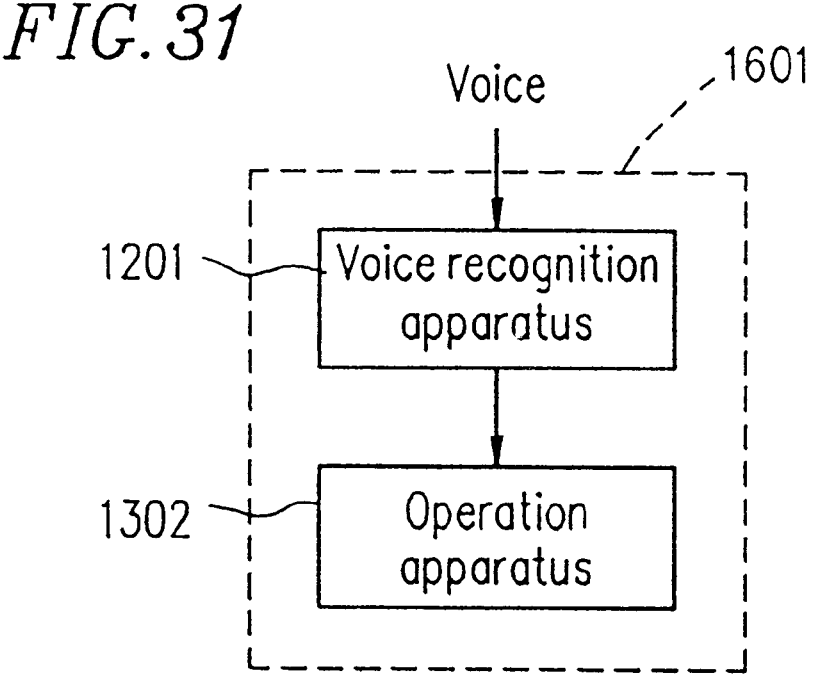
FIG. 31 is a diagram showing a configuration for a voice response apparatus incorporating a voice recognition apparatus and an operation apparatus of the present invention.

In the above-described manner, the apparatus of this invention performs the voice recognition. The voice recognition apparatus can be used in conjunction with the voice selection apparatus 1202 described in Example 4 as shown in FIG. 27, or can be used in conjunction with the direction selection apparatus 1401 and the operation apparatus 1302 described in Example 5 as shown in FIG. 29. Alternatively, if the voice recognition apparatus is simply combined with the operation apparatus 1302 as shown in FIG. 31, a voice response apparatus 1601 in which the result of the voice recognition apparatus 1201 is used as the input of the operation apparatus 1302, whereby the whole apparatus is moved in the target direction can be constructed. Alternatively, the voice recognition apparatus of this example can be incorporated in a game apparatus as in Examples 1 to 3. This allows the game apparatus to be operated by voice of an operator.

Figure 32:
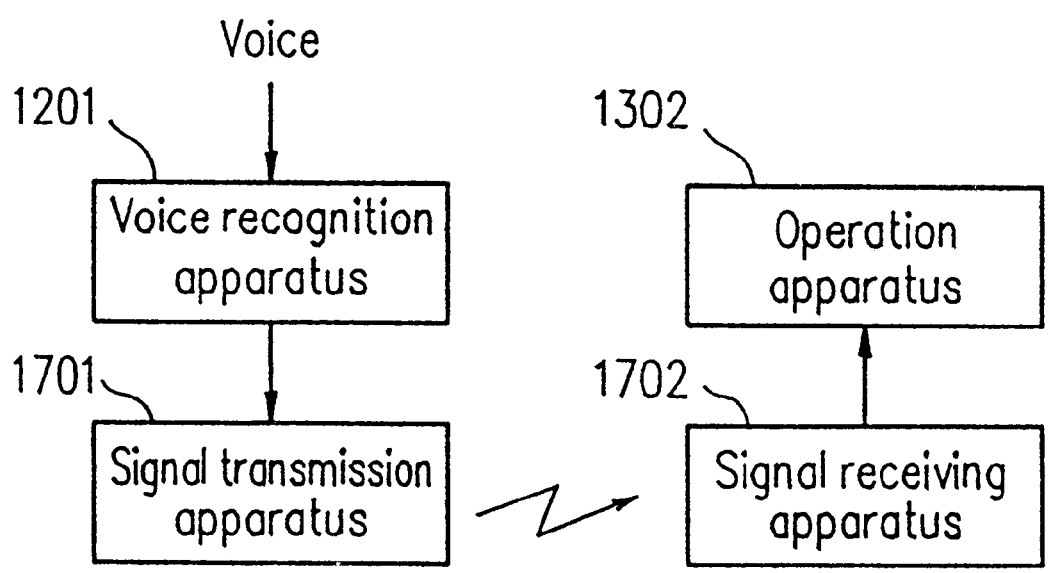
FIG. 32 is a diagram showing a configuration for a voice response apparatus capable of being remote-controlled.

In addition, if in the voice response apparatus described in Examples 4 to 6 which includes the voice recognition apparatus 1201, a signal transmission apparatus 1701 is added to the voice recognition apparatus, and a signal receiving apparatus 1702 is added to the voice selection apparatus 1202, the direction selection apparatus 1401, or the operation apparatus 1302 which is connected after the voice recognition apparatus in the respective configuration, as shown in FIG. 32, it is possible to perform the remote control of the object by using only the voice recognition apparatus as the remote control device held by the operator. Herein, infrared rays or a radio transmission can be used for the signal transmission.

By attaching the above-described voice response apparatus to a balloon, it is possible to interact with the balloon, or to control the balloon. Thus, a toy which effectively utilizes the heart warming character inherent to the balloon can be produced.

Figure 33:
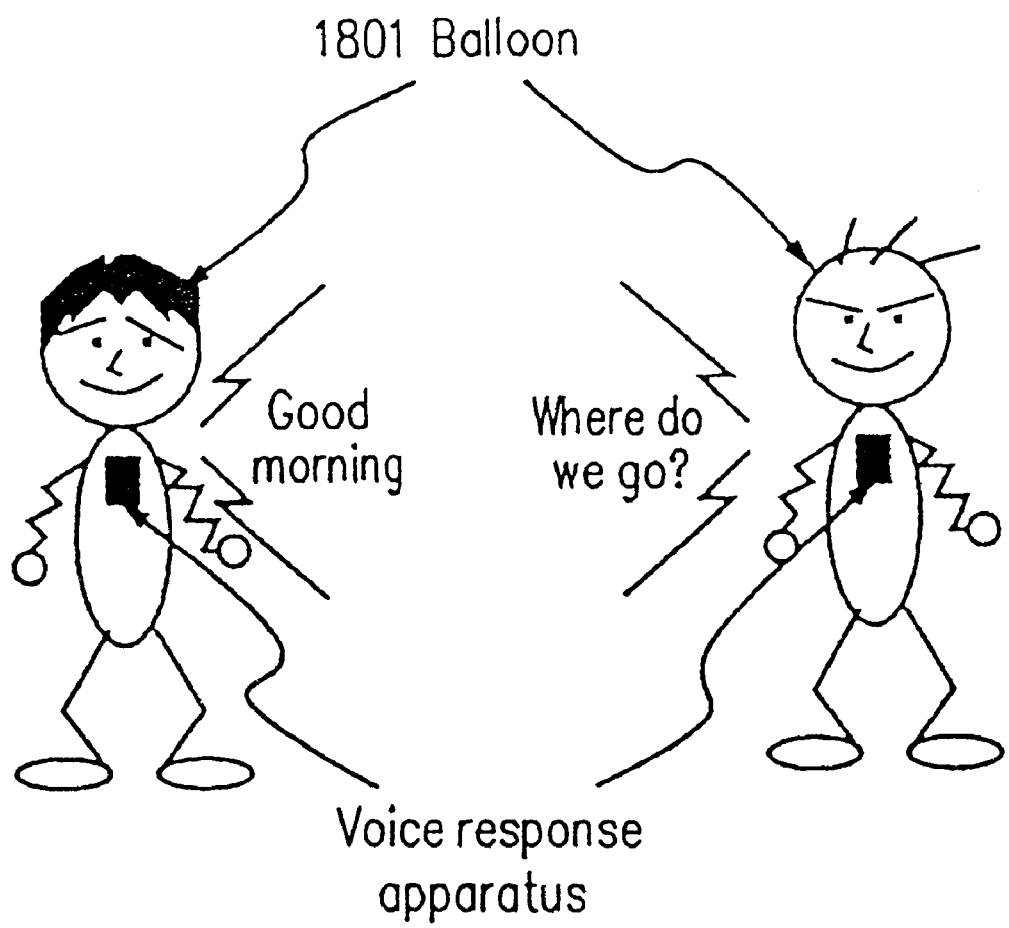
FIG. 33 is a diagram showing an example of a toy incorporating a voice response apparatus of the present invention.
Figure 34:
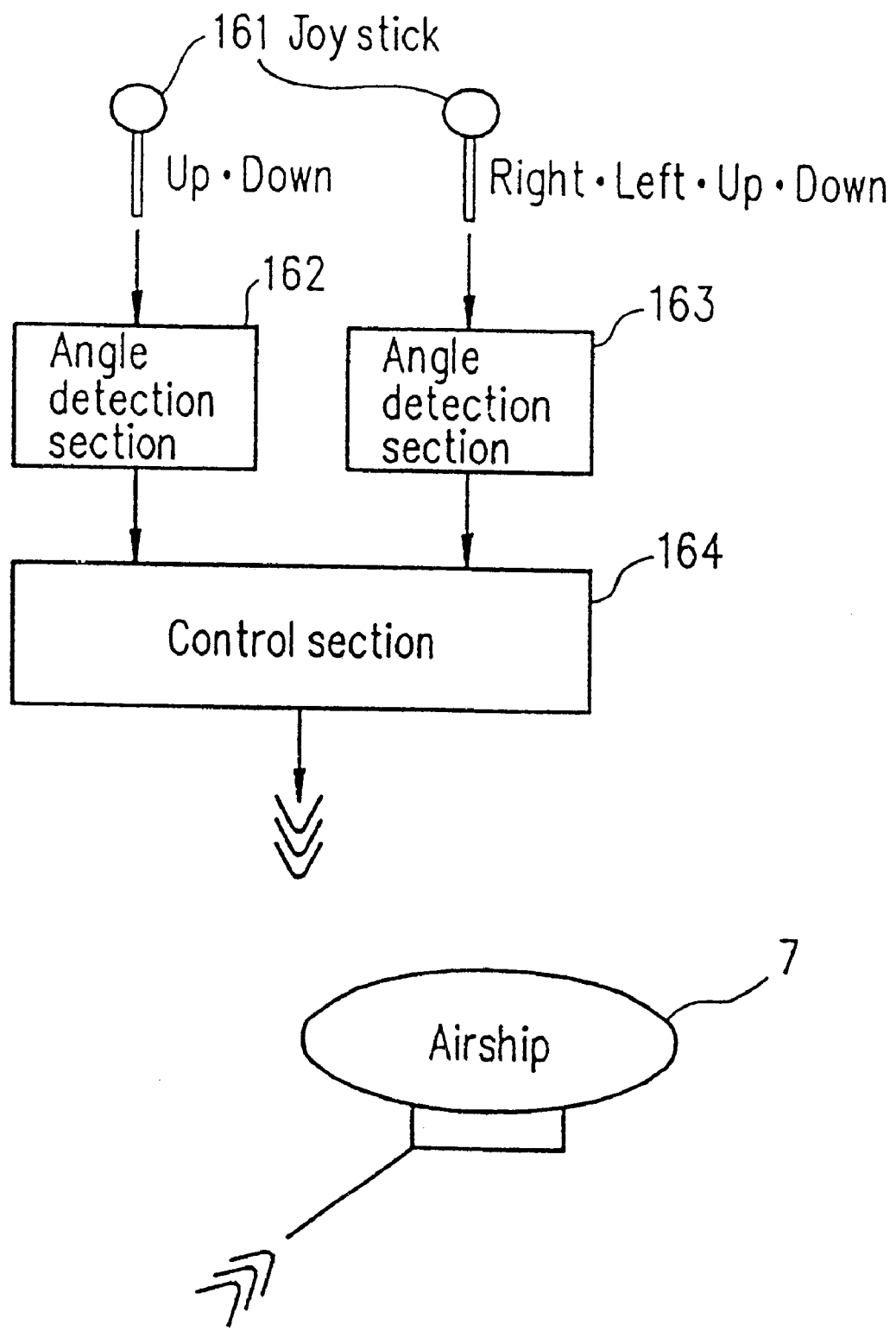
FIG. 34 is a diagram showing a configuration for a conventional game apparatus.

As shown in FIG. 33, two balloons 1801 to which the voice response apparatus 1203 provided with the above-descried voice recognition apparatus and the voice selection apparatus are prepared, and the two voice response apparatus are constructed so as not to interact with a person, but to interact with each other. As a result, a toy in which the components automatically interact with each other can be produced. In addition, a plurality of balloons 1801 provided with the voice response apparatus are prepared, and they can be constructed so as to interact with each other. At this time, if each of the balloons provided with the voice response apparatus has a reject function in the voice recognition process, it is possible for the balloon to respond to a specific word. As a result, it is possible to construct in such a manner that any one balloon among a plurality of balloons can respond to certain specific voice. For example, names are applied to the respective balloons 1801, and each of the balloons 1801 can respond to the voice indicating the corresponding name. As for the reject method, a distance from the internal dictionary is calculated for the voice recognition, and a threshold value is experimentally determined, so that a distance which exceeds the threshold is rejected. Furthermore, a clock timer may be incorporated in the voice response apparatus. When a predetermined time period elapses, one voice set is selected at random from among the registered group of output voice sets, and the selected voice is output, whereby a toy by which the interaction can be started by the voice response apparatus can be produced.

The object to be controlled is not limited to the balloon, but can be a stuffed toy, a doll, a photograph, or a picture. Alternatively, the object may be a moving picture in a display. Furthermore, as the object, an anti-gravity apparatus other than the balloon (e.g., a helicopter which is levitated by a propeller, or a linear motor car which is levitated by means of magnet) can be used.

As described above, according to the invention, the natural operation can be performed by voice of a human, and the game apparatus does not require proficiency in the operation. In addition, the input word (command) is recognized not only by the voice, but also by the movement of lips, so that a stable operation can be realized even in a noisy environment. Moreover, the movement of lips is detected by the combination of the LED and the photodiode (a phototransistor), so that the whole device can be produced at low cost, as compared with the case where a video camera, ultrasonic, or the like is used.

Furthermore, in the voice recognition apparatus of this invention, the speech period of a speaker is detected by the movement of lips, and the period is used for the recognition of voice, so that it is possible to prevent an erroneous recognition of voice uttered by a person other than the speaker. In another voice recognition apparatus of the invention, the input word (command) is recognized based on the movement of lips, and the airship is controlled by the recognition result, so that the invention can be used in a noisy environment or under circumstances that do not allow easy utterance by a speaker, and can be used by those who have speech impediments.

In the input device of the invention, an inexpensive light emitting element (such as an LED) and an inexpensive photodetective element (such as a photodiode) are attached to the light head set, the supporting bar, and the stage, so that the input device can be realized to be very light in weight and cheap in price.

As described above, the voice selection apparatus of the invention prepares a plurality of input/output states, and changes the input/output state based on the history of the previous inputs and outputs. Accordingly, it is possible to provide an apparatus which can perform an easy conversation by using the voice selection apparatus. The voice selection apparatus of the invention prepares a plurality of outputs for one input, and one output is selected at random from the outputs, so that various kinds of responses can be performed for one kind of input.

The direction detection apparatus of the invention inputs voice by using a plurality of microphones and detects a microphone which provides the maximum energy. Accordingly, it is possible to detect the direction in which the voice is originated. By using the direction selection apparatus of the invention, the object can be accurately moved in the specified direction or the object can be accurately turned to the specified direction, while the present position is detected by an azimuth compass.

In the voice recognition apparatus of the invention, the voice termination point detection apparatus first roughly obtains the termination point of the voice, and then the voice detection apparatus automatically obtains the threshold value. At this time, the threshold value is determined by using the maximum energy of the input voice, and the minimum energy of the smoothed energy, so that it is possible to perform good voice period extraction, irrespective of the length of the speech period. When the voice detection apparatus detects the voice by using the threshold value, the feature amount is obtained from the voice, and the voice recognition is performed based on the feature amount.

By appropriately combining the above-described apparatus, various voice response apparatus can be obtained. For example, when the voice recognition apparatus is combined with the voice selection apparatus, a voice response apparatus which can respond to the human voice can be obtained, so that a man-to-machine interface can be constructed. When the direction detection apparatus is combined with the operation apparatus, the object can be operated in response to the voice. When the voice recognition apparatus, the direction selection apparatus, and the operation apparatus are combined, the object can be moved accurately in the direction indicated by the voice contents, or the direction of the object can be changed to the direction indicated by the voice contents. Furthermore, if a signal transmission apparatus is connected to the voice recognition apparatus in the voice response apparatus, and a signal receiving apparatus is connected to an apparatus after the voice recognition apparatus and attached to the object, a voice response apparatus which can perform a remote control can be realized.

If a plurality of voice response apparatus which are described above are provided, it is possible to construct a toy in which the voice response apparatus can automatically perform the conversation therebetween. If the voice response apparatus is attached to each balloon, it is possible to produce a toy having the heart warming character inherent to the balloon and capable of performing a conversation. If a clock timer is incorporated, and the apparatus is constructed so as to output appropriate voice after a certain time period elapses, it is possible to realize a voice response apparatus which can start a conversation, instead of responding to the voice by a human.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A voice selection apparatus comprising:
   first memory means for storing a plurality of tables, each of the tables including a plurality of words which can be output for one input signal based on a voice which is uttered by a human being, as respective conversation-based voice selections;
   second memory means for storing one of the plurality of tables;
   selection means for selecting one word from the plurality of words included in the one table stored in the second memory means in accordance with an input which is an externally input signal based on a voice which is uttered by a human being, and for outputting the selected one word as a voice selection; and
   change means for changing the one table stored in the second memory to another table of the plurality of tables stored in the first memory means, the table being determined depending on the selected one word.

2. A voice selection apparatus according to claim 1 further comprising means for generating a random number, wherein the selection means selects the one word from the plurality of words by using the random number.

3. A voice response apparatus comprising:

a voice selection apparatus according to claim 1; and a voice recognition apparatus for receiving voice, for recognizing the voice, and for outputting the recognition result to the voice selection apparatus.

4. A game apparatus comprising a voice response apparatus according to claim 3, and visual graphics operatively combined with the output of the selection means.

5. A game apparatus comprising a plurality of voice response apparatuses according to claim 3, whereby the plurality of voice response apparatuses are configured to perform a conversation with each other.

6. A voice selection apparatus comprising:

memory means for storing a table, the table including a plurality of words which can be output in response to one input signal based on a voice which is uttered by a human being, as respective conversation-based voice selections;

selection means for receiving an input which is an externally input signal based on a voice which is uttered by a human being, for selecting one word from the plurality of words included in the table which is stored in the memory means by using a random number, and for outputting the selected one word as a voice selection; and means for generating the random number.

7. A voice response apparatus comprising:

a voice selection apparatus according to claim 6; and a voice recognition apparatus for receiving voice, for recognizing the voice, and for outputting the recognition result to the voice selection apparatus.

8. A game apparatus comprising a voice response apparatus according to claim 7, and visual graphics operatively combined with the output of the selection means.

* * * * *

UNITED STATES PATENT AND TRADEMARK OFFICE
CERTIFICATE OF CORRECTION

| | |
|---|---|
| PATENT NO. | : 6,471,420 B1 |
| APPLICATION NO. | : 08/434760 |
| DATED | : October 29, 2002 |
| INVENTOR(S) | : Hidetsugu Maekawa et al. |

Page 1 of 1

It is certified that error appears in the above-identified patent and that said Letters Patent is hereby corrected as shown below:

In the Title, line 1, after "APPARATUS" insert --,--.

In the last line under "OTHER PUBLICATIONS", "Empire" should be --Example--.

Signed and Sealed this

Eleventh Day of December, 2007

JON W. DUDAS
*Director of the United States Patent and Trademark Office*